US012109801B2

(12) United States Patent
Iwata et al.

(10) Patent No.: US 12,109,801 B2
(45) Date of Patent: Oct. 8, 2024

(54) SHEET CONVEYING APPARATUS

(71) Applicants: Toshiyuki Iwata, Tokyo (JP); Yuuki Kubota, Yamanashi-ken (JP); Tsukasa Kondo, Yamanashi-ken (JP); Tetsuya Kawasaki, Yamanashi-ken (JP)

(72) Inventors: Toshiyuki Iwata, Tokyo (JP); Yuuki Kubota, Yamanashi-ken (JP); Tsukasa Kondo, Yamanashi-ken (JP); Tetsuya Kawasaki, Yamanashi-ken (JP)

(73) Assignee: CANON FINETECH NISCA INC., Misato (JP)

( * ) Notice: Subject to any disclaimer, the term of this patent is extended or adjusted under 35 U.S.C. 154(b) by 209 days.

(21) Appl. No.: 17/411,263

(22) Filed: Aug. 25, 2021

(65) Prior Publication Data

US 2022/0063299 A1 Mar. 3, 2022

(30) Foreign Application Priority Data

Aug. 28, 2020 (JP) ................................ 2020-144971

(51) Int. Cl.
*B65H 9/10* (2006.01)
*B41J 11/00* (2006.01)
(Continued)

(52) U.S. Cl.
CPC ............ *B41J 11/007* (2013.01); *B65H 5/023* (2013.01); *B65H 5/025* (2013.01); *B65H 5/062* (2013.01); *B65H 5/068* (2013.01)

(58) Field of Classification Search
CPC ........ B41J 11/007; B65H 5/023; B65H 5/025; B65H 5/062; B65H 5/068; B65H 9/00; B65H 9/101
See application file for complete search history.

(56) References Cited

U.S. PATENT DOCUMENTS

| | | | | |
|---|---|---|---|---|
| 5,540,370 A * | 7/1996 | Ring | B65H 29/60 271/253 |
| 6,567,644 B1 * | 5/2003 | Yasui | B65H 31/34 399/401 |
| 10,315,880 B2 | 6/2019 | Nakano | |

FOREIGN PATENT DOCUMENTS

| | | |
|---|---|---|
| JP | H09-503988 A | 4/1997 |
| JP | 2001-278528 A | 10/2001 |

(Continued)

OTHER PUBLICATIONS

Japan Patent Office, "Notice of Reasons for Refusal for Japanese Application No. 2020-144971", mailed Jul. 9, 2024, 12 pp.

*Primary Examiner* — Thomas A Morrison
(74) *Attorney, Agent, or Firm* — HAUPTMAN HAM, LLP

(57) ABSTRACT

The apparatus is capable of handling sheets of various lengths while suppressing an increase in apparatus size, wherein each of a pair of regulating guides is movable to a guide position at which an end edge of a sheet in a sheet width direction can be guided by a guide surface and to a retracting position retracting further away from the sheet width direction end edge than the guide position. For sheets S1 and S2 each having a first sheet length, the pair of regulating guides is made to reach the guide position from the retracting position in a state where the front end of the sheet is located between upstream and downstream ends of the guide surface. For a sheet S3 having a second sheet length that is longer than the first length, the pair of regulating guides is made to reach the guide position from the retracting position.

7 Claims, 11 Drawing Sheets

(51) Int. Cl.
*B65H 5/02* (2006.01)
*B65H 5/06* (2006.01)

(56) References Cited

FOREIGN PATENT DOCUMENTS

| | | | |
|---|---|---|---|
| JP | 2007-217096 | A | 8/2007 |
| JP | 2018-047965 | A | 3/2018 |
| WO | 95/33602 | A1 | 12/1995 |

* cited by examiner

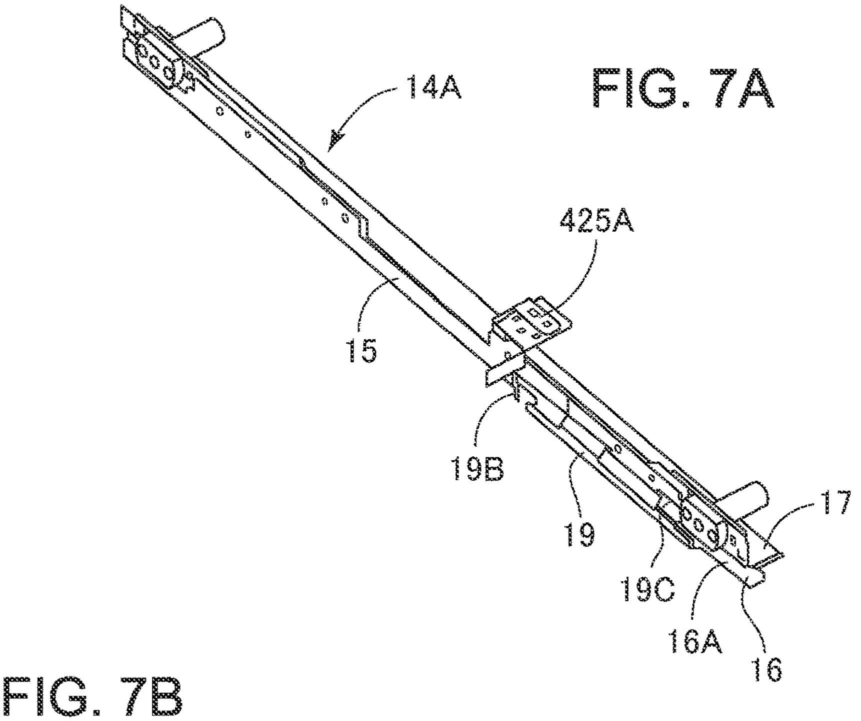
FIG. 7A
FIG. 7B
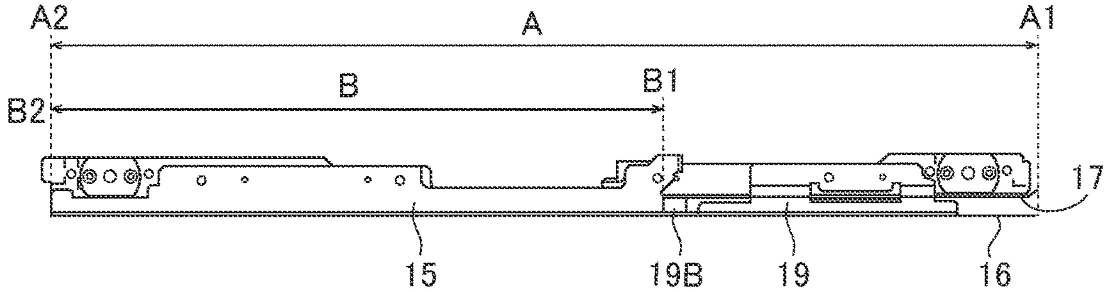
FIG. 7C
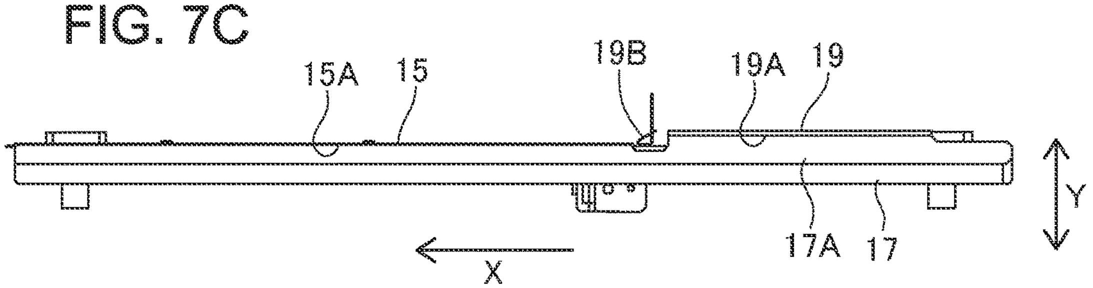
FIG. 7D
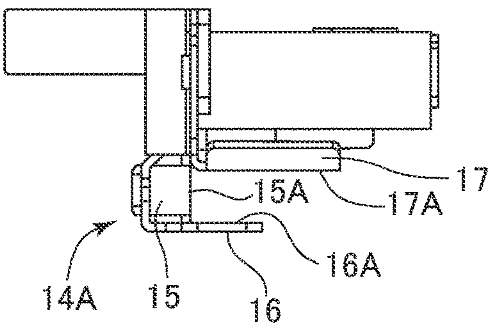

SHEET CONVEYING APPARATUS

TECHNICAL FIELD

The present invention relates to a sheet conveying apparatus that conveys sheets.

BACKGROUND ART

In a sheet conveying apparatus for conveying a sheet, a sheet may be displaced due to various factors during the conveyance of the sheet. When the displaced sheet is conveyed without being corrected to an image forming apparatus for forming an image on a sheet, the formed image may be displaced with respect to the sheet. To cope with this, a sheet conveying apparatus that corrects displacement of a sheet being conveyed is proposed (for example, JP 2007-217096A).

JP 2007-217096A discloses a configuration including a fixed reference guide provided on one side in the width direction crossing the sheet conveying direction, a conveying belt provided inclined to the reference guide, and balls. In the sheet conveying apparatus described in JP 2007-217096A, a sheet is conveyed while being nipped between the conveying belt and the balls with the end edge thereof in the width direction abutting against the reference guide. With this configuration, side registration (displacement of the sheet end edge in the width direction) and side skew (inclination of the sheet end edge in the width direction relative to the sheet conveying direction) of the sheet are corrected at the same time.

DISCLOSURE OF INVENTION

Problems to be Solved by the Invention

In the sheet conveying apparatus described in JP 2007-217096A, a sheet is conveyed by the inclined conveying belt with the end edge thereof in the sheet width direction abutting against the reference guide. Thus, the sheet needs to be conveyed until it abuts against the reference guide. This may increase apparatus size due to needs for ensuring a length enough to achieve such sheet conveyance. Particularly, when sheets to be conveyed include a sheet having a long length in the sheet conveying direction, the apparatus needs to be designed with reference to the long sheet, resulting in an increase in the apparatus size.

It is an object of the present invention to provide a configuration capable of handling sheets of various lengths while suppressing an increase in the apparatus size.

Means for Solving the Problem

A sheet conveying apparatus according to the present invention is an apparatus that receives and conveys a sheet conveyed by a conveying unit for conveying sheets in a predetermined conveying direction and includes: an endless conveying belt that is provided downstream of the conveying unit in the predetermined conveying direction, the belt having a conveying surface extending in the predetermined conveying direction and conveying the sheet passed to the conveying surface in the predetermined conveying direction; a plurality of balls that are arranged in the predetermined conveying direction so as to face the conveying surface and configured to be rotatable in any direction while nipping the sheet with the conveying surface; a pair of regulating guides that are disposed on both sides of the conveying belt in a sheet width direction crossing the predetermined conveying direction and each have a support surface that supports an end edge in the sheet width direction of the sheet conveyed while being nipped by the conveying belt and the balls and a guide surface that faces the sheet width direction end edge of the sheet; and a guide moving unit that moves each of the pair of regulating guides to a first guide position at which the sheet width direction end edge of the sheet conveyed while being nipped by the conveying belt and the balls is supported by the support surface and guided by the guide surface and to a second guide position at which the sheet width direction end edge of the sheet is supported by the support surface and which is retracting further away from the sheet width direction end edge of the sheet than the first guide position. For a sheet having a first sheet length in the predetermined conveying direction, the guide moving unit locates the pair of regulating guides at the second guide position when the sheet is passed from the conveying unit to the conveying belt and then makes the pair of regulating guides reach the first guide position from the second guide position in a state where a front end of the sheet conveyed while being nipped by the conveying belt and the balls is located between upstream and downstream ends of the guide surface in the predetermined conveying direction. For a sheet having a second sheet length longer than the first sheet length, the guide moving unit locates the pair of regulating guides at the second guide position when the sheet is passed from the conveying unit to the conveying belt and then makes the pair of regulating guides reach the first guide position from the second guide position in a state where the front end of the sheet conveyed while being nipped by the conveying belt and the balls is located downstream from the downstream end of the guide surface in the predetermined conveying direction.

According to the present invention, it is possible to handle sheets of various lengths while suppressing an increase in apparatus size.

BRIEF DESCRIPTION OF DRAWINGS

FIGS. 7A to 7D are views illustrating a regulating guide according to the embodiment, in which FIG. 7A is a perspective view, FIG. 7B is a view seen from the left in FIG. 7A, FIG. 7C is a cross-sectional view taken along a sheet conveying direction, and FIG. 7D is a cross-sectional view taken along a direction perpendicular to the sheet conveying direction;

FIGS. 9A and 9B are side views of the contact/separation mechanism of the conveying roller pair according to the embodiment, in which FIG. 9A illustrates a nip state of the conveying roller pair, and FIG. 9B illustrates a nip release state of the conveying roller pair;

MODE FOR CARRYING OUT THE INVENTION

An embodiment of the present invention will be described with reference to FIGS. 1 to 11. First, an image forming system according to the present embodiment will be described with reference to FIG. 1.

[Image Forming System]

Figure 1:
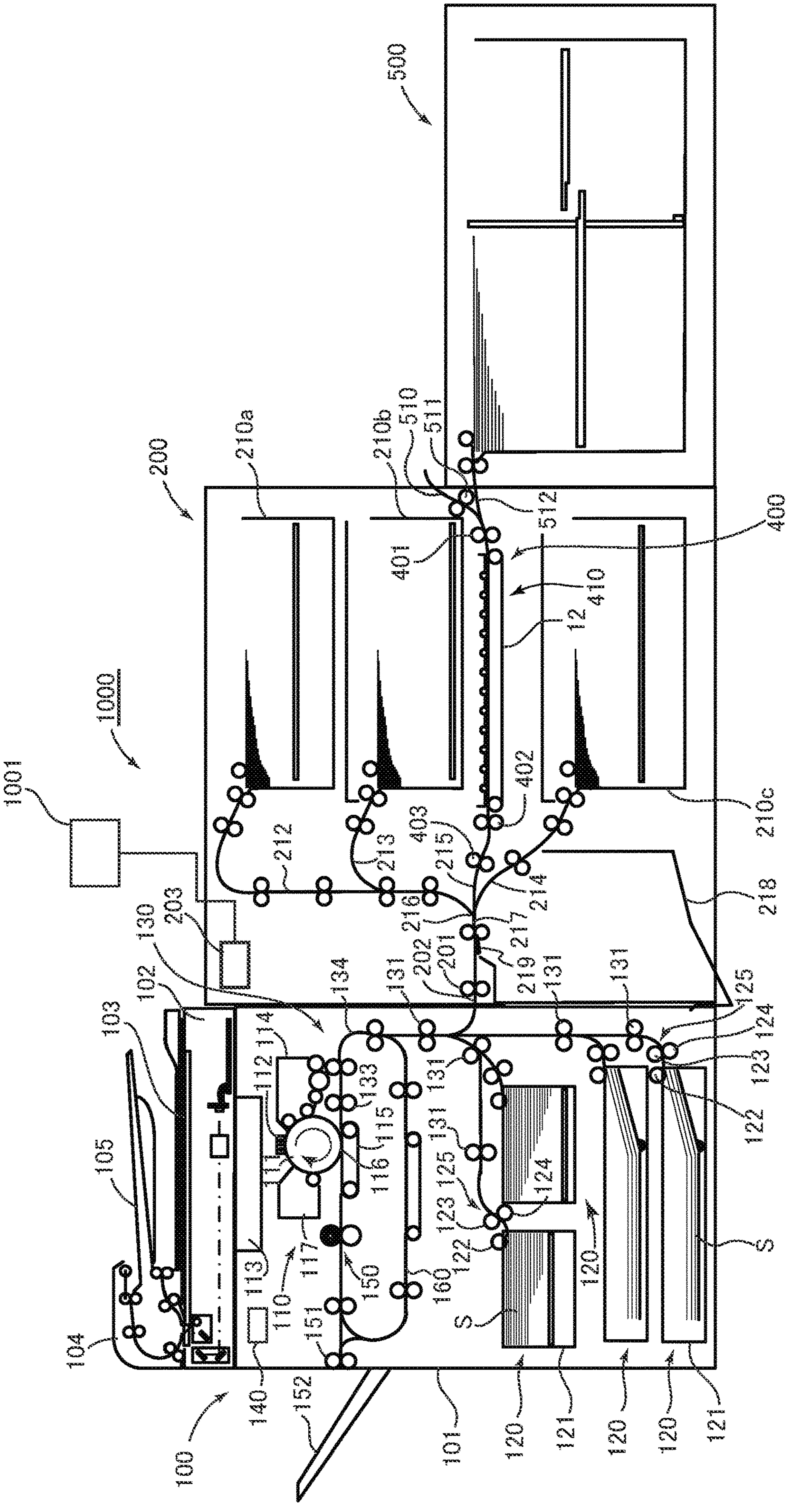
FIG. 1 is a cross-sectional view schematically illustrating the configuration of an image forming system according to an embodiment of the present invention.

FIG. 1 is a cross-sectional view schematically illustrating an example of an image forming system according to the present embodiment which is provided with a multi-stage feeder and an image forming apparatus. Hereinafter, an electrophotographic laser printer system (hereinafter, referred to merely as "printer") is taken as an example of an image forming apparatus having an image forming part. The image forming apparatus constituting the image forming system is not limited to a printer, but may be a copier, a fax machine, or a multifunction machine. Further, the image forming apparatus is not limited to of an electrophotographic type, but may be of other types such as an inkjet system.

An image forming system 1000 according to the present embodiment has an image forming apparatus 100, a multi-stage feeder 200 as a sheet feeding apparatus connected to the image forming apparatus 100, and a feeding deck 500. Although the details will be described later, the multi-stage feeder 200 has a plurality of storage cases each capable of storing a plurality of sheets, and the sheets can be fed from each of the storage cases to the image forming apparatus 100. The feeding deck 500, which also has a storage case capable of storing a plurality of sheets, is disposed upstream relative to the multi-stage feeder 200 in the sheet conveying direction. The sheet fed from the feeding deck 500 is conveyed to the image forming apparatus 100 through a relay conveying apparatus 400 provided in the multi-stage feeder 200. Examples of the sheet include a paper sheet such as plain paper, thin paper, or a cardboard, and a plastic sheet.

The image forming apparatus 100 forms a toner image on a sheet according to an image signal from a document reading apparatus 102 connected to an image forming apparatus body 101 or a host device such as a personal computer communicably connected to the image forming apparatus body 101. In the present embodiment, the document reading apparatus 102 is disposed above the image forming apparatus body 101.

The document reading apparatus 102 irradiates light onto a document placed on a platen glass 103 using a scanning optical system light source and inputs the reflected light from the document to a CCD to thereby read a document image. The document reading apparatus 102 has an automatic document feeder (ADF) 104 and can automatically convey the document placed on a tray 105 to a reading part of the document reading apparatus 102 using the ADF 104 for document image reading. The read document image is transmitted in the form of an electrical signal to a laser scanner 113 of an image forming part 110 to be described later. The laser scanner 113 may receive image data transmitted from a personal computer or other device, as described above.

The image forming apparatus 100 has an image forming part 110, a plurality of sheet feeding units 120, a sheet conveying unit 130, and other components. The components of the image forming apparatus 100 are each controlled by a control part 140. The control part 140 has a CPU (Central Processing Unit), a ROM (Read Only Memory), and a RAM (Random Access Memory). The CPU controls the components while reading a program corresponding to a control procedure stored in the ROM. The RAM stores therein work data or input data, and the CPU performs control according to the above-mentioned program while referring to the above data stored in the RAM.

The plurality of sheet feeding units 120 each have a cassette 121 for storing sheets S, a pickup roller 122, and a separating and conveying roller pair 125 constituted of a feeding roller 123 and a retard roller 124. The sheets S stored in the cassette 121 are fed one by one by the pickup roller 122 rotating while moving up and down at a predetermined timing and separating and conveying roller pair 125.

The sheet conveying unit 130 has a conveying roller pair 131 and a registration roller pair 133. The sheet S fed from the sheet feeding unit 120 is made to pass through a sheet conveyance path 134 by the conveying roller pair 131 and is then guided to the registration roller pair 133. Then, the sheet S is fed to the image forming part 110 at a predetermined timing by the registration roller pair 133.

A sheet conveyed from the multi-stage feeder 200 or feeding deck 500, which are to be described later, through a conveying roller pair 201 is then conveyed to the image forming apparatus 100 through a connection path 202 connecting to the image forming apparatus 100. Like the sheet conveyed from the sheet feeding unit 120 in the image forming apparatus 100, the sheet conveyed from the multi-stage feeder 200 or feeding deck 500 to the image forming apparatus 100 is fed to the image forming part 110 at a predetermined timing by the registration roller pair 133.

The image forming part 110 has a photosensitive drum 111, a charger 112, a laser scanner 113, a developing unit 114, a transfer unit 115, a cleaner 117, and other components. At the time of image formation, the photosensitive drum 111 is driven into rotation in a direction of the arrow shown in FIG. 1, and the surface of the photosensitive drum 111 is uniformly charged by the charger 112. Then, a laser light that the laser scanner 113 emits according to an image signal is irradiated onto the charged photosensitive drum 111, whereby an electrostatic latent image is formed on the photosensitive drum 111. The electrostatic latent image thus formed on the photosensitive drum 111 is then visualized as a toner image by the developing unit 114.

Thereafter, the toner image on the photosensitive drum 111 is transferred onto the sheet S by the transfer unit 115 at a transfer part 116. The sheet S onto which the toner image has been transferred is conveyed to a fixing device 150, where the toner image is fixed. After that, the resultant sheet S is discharged to a discharge tray 152 outside the apparatus by a discharge roller 151.

To form a toner image on the back surface of the sheet S, the sheet S discharged from the fixing device 150 is conveyed to a reverse conveyance path 160, where the front and back sides of the sheet S is reversed. Then the resultant sheet S is conveyed once again to the transfer part 116 of the image forming part 110. The sheet S carrying a toner image on the back surface thereof is conveyed to the fixing device 150, where the toner image is fixed, and the resultant sheet S is discharged to the discharge tray 152 by the discharge roller 151. Toner remaining on the photosensitive drum 111 after transfer is removed by the cleaner 117.

[Multi-Stage Feeder]

The following describes the outline of the multi-stage feeder 200 with reference to FIG. 1. The multi-stage feeder

200 has a plurality of storage cases 210*a* to 210*c*, the relay conveying apparatus 400, and other components. In the present embodiment, the storage cases (210*a* to 210*c*) are arranged vertically in three stages, and the relay conveying apparatus 400 is disposed between the lowermost storage case 210*c* and the second topmost storage case 210*b*.

A sheet fed from the topmost storage case 210*a* is conveyed to a conveyance path 212, a sheet fed from the second topmost storage case 210*b* is conveyed to a conveyance path 213, and a sheet fed from the lowermost storage case 210*c* is conveyed to a conveyance path 214. A sheet fed from the relay conveying apparatus 400 is conveyed to a conveyance path 215. The conveyance path 213 merges with the conveyance path 212 along the way, and the conveyance paths 212, 214, and 215 merge at a merge point 216. Thus, a sheet conveyed along the conveyance paths 212, 213, 214, or 215 is conveyed to a conveying roller pair 201 through a conveyance path 217 and then to the image forming apparatus 100 through the connection path 202.

A multi-feed detection sensor for detecting multi-feed of the sheet is disposed in the conveyance path 212 after merging with the conveyance path 213, the relay conveying apparatus 400, and the conveyance path 214. Sheets, the multi-feed of which is detected by the multi-feed detection sensor, are conveyed to the conveyance path 217. A multi-fed sheet storage part (escape tray) 218 for storing the sheets, the multi-feed of which is detected, is provided below the conveyance path 217. Upon detection of the multi-feed, the sheets are conveyed to the conveyance path 217, where the conveyance path is switched by a switching member 219 provided in the conveyance path 217, with the result that the sheets are conveyed to the multi-fed sheet storage part 218.

Components of the multi-stage feeder 200 are each controlled by a control part 203. The control part 203 has a CPU (Central Processing Unit), a ROM (Read Only Memory), and a RAM (Random Access Memory). The control part 203 can communicate with the control part 140 of the image forming apparatus 100. By communicating with the control part 140, the control part 203 controls, for example, a sheet feeding timing.

A sheet fed from the feeding deck 500 positioned upstream relative to the multi-stage feeder 200 is conveyed to the relay conveying apparatus 400 through a conveyance path 512. Further, the multi-stage feeder 200 allows manual sheet feeding. A sheet manually fed is conveyed to the conveyance path 510 that merges with the conveyance path 512 and then conveyed by a conveying roller pair 511 to the relay conveying apparatus 400 through the conveyance path 512.

Although details will be described later, the relay conveying apparatus 400 has a displacement correction part 410 provided with a conveying belt 12. A conveying roller pair 401 and a conveying roller pair 402, which are conveying members, are disposed upstream and downstream relative to the displacement correction part 410 in the sheet conveying direction, respectively. A sheet on the conveyance path 512 is conveyed to the displacement correction part 410 by the conveying roller pair 401. The sheet is subjected to side registration (displacement of the sheet end edge in the width direction) correction and side skew (inclination of the sheet end edge in the width direction relative to the sheet conveying direction) correction in the displacement correction part 410 and passed to the conveying roller pair 402 positioned on the upstream side. After that, the sheet is conveyed to the conveyance path 215 by the conveying roller pair 402 and a conveying roller pair 403 positioned upstream relative to the conveying roller pair 402. As described above, the relay conveying apparatus 400 corrects displacement of the sheet conveyed from the feeding deck 500 positioned on the upstream side and passes the resultant sheet to the image forming apparatus 100 positioned on the downstream side.

[Relay Conveying Apparatus]

Figure 2:
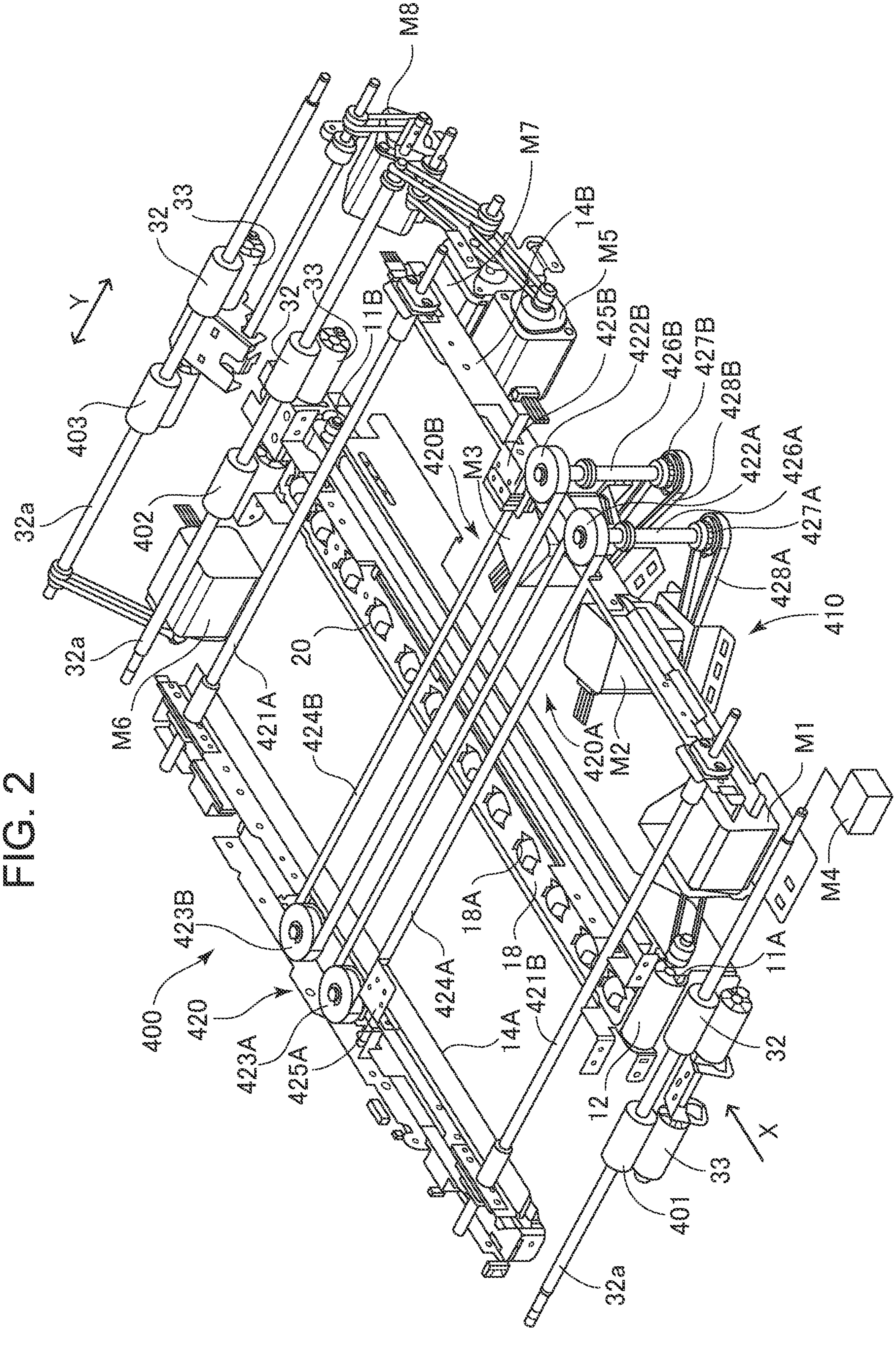
FIG. 2 is a perspective view of a relay conveying apparatus according to the embodiment.
Figure 3:
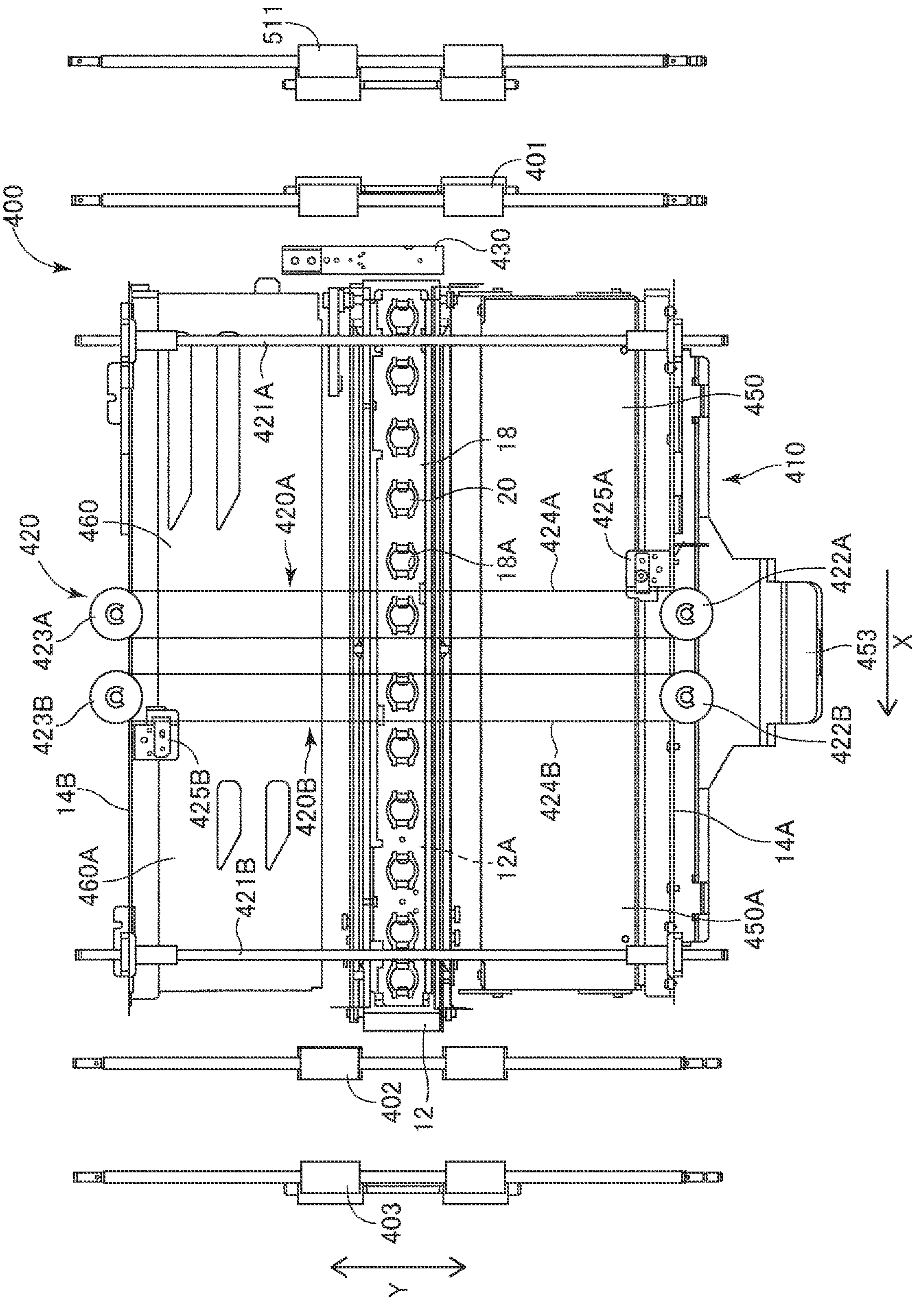
FIG. 3 is a plan view of the relay conveying apparatus according to the embodiment.

The following describes the relay conveying apparatus 400 as a sheet conveying apparatus. First, the schematic configuration of the relay conveying apparatus 400 will be described with reference to FIGS. 2 to 6. The relay conveying apparatus 400 receives and conveys a sheet conveyed by the conveying roller pair 401 as a conveying unit (convey member) for conveying a sheet in a conveying direction (predetermined conveying direction) X. Specifically, a sheet is passed from the conveying roller pair 401 on the upstream side to the above-mentioned displacement correction part 410 to be subjected to displacement correction and is then passed from the displacement correction part 410 to the conveying roller pair 402 on the downstream side. As illustrated in FIG. 3, the conveying roller pairs 401 and 402 each including two roller parts each composed of a drive roller and a driven roller and separated from each other in the rotary axis direction. In particular, the width (length in the width direction Y, i.e., the distance between the upper end of the upper side (as viewed in FIG. 3) roller part and the lower end of the lower side (as viewed in FIG. 3) roller part in the two roller parts of the conveying roller pair 402 arranged in the rotary axis direction) of the conveying roller pair 402 is larger than the width (length in the width direction) of the conveying belt 12. The displacement correction part 410 has the conveying belt 12, a plurality of balls 20, a pair of regulating guides 14A, 14B, a guide moving part 420, and other members.

The conveying belt 12 is disposed downstream side in the conveying direction X (downstream side in the conveying direction) of the conveying roller pair 401 as a conveying unit (convey member) for conveying a sheet in the conveying direction X. The conveying belt 12 is an endless belt wound over pulleys 11A and 11B and has a conveying surface 12A extending in the conveying direction X. The pulley 11A is connected with a motor M1 as a drive source, and the conveying belt 12 rotates by receiving drive from the motor M1. The thus configured conveying belt 12 receives a sheet from the conveying roller pair 401 on the upstream side in the conveying direction X at the conveying surface 12A and conveys the sheet in the conveying direction X.

The plurality of balls 20 are arranged in the conveying direction X so as to face the conveying surface 12A of the conveying belt 12. The center position of the balls 20 serves as the center reference position of the sheet. That is, the position where the centers of the balls 20 are aligned is the center reference position of the sheet. The center reference position is a position coinciding with both the width-direction centers of first and second sheets having different widths (that is, the center reference position coincides with the sheet width-direction center regardless of the sheet size). In other words, the balls 20 are arranged at the center position between the pair of regulating guides 14A and 14B. One of the regulating guides 14A and 14B may be fixedly provided.

The arrangement direction of the balls 20 coincides with a sheet guide direction of a guide surface 15A (FIG. 6) of the regulating guides 14A and 14B to be described later. The guide direction of the regulating guides 14A and 14B and the conveying direction X of the conveying belt 12 substantially coincide with each other.

In the present embodiment, the balls 20 are disposed above the conveying belt 12. The balls 20 can rotate in any direction while nipping a sheet with the conveying surface 12A. To this end, the balls 20 are held by a holding plate 18 provided above the conveying belt 12 so as to be freely rotatable in any direction. That is, as illustrated in FIGS. 2 and 3, the holding plate 18 is an elongated plate disposed in the conveying direction X at a position separated from the conveying surface 12A by a predetermined distance and has a plurality of holding holes 18A which are arranged at intervals from one another in the conveying direction X. The balls 20 are thus freely rotatably held in the respective holding holes 18A.

Figure 4:
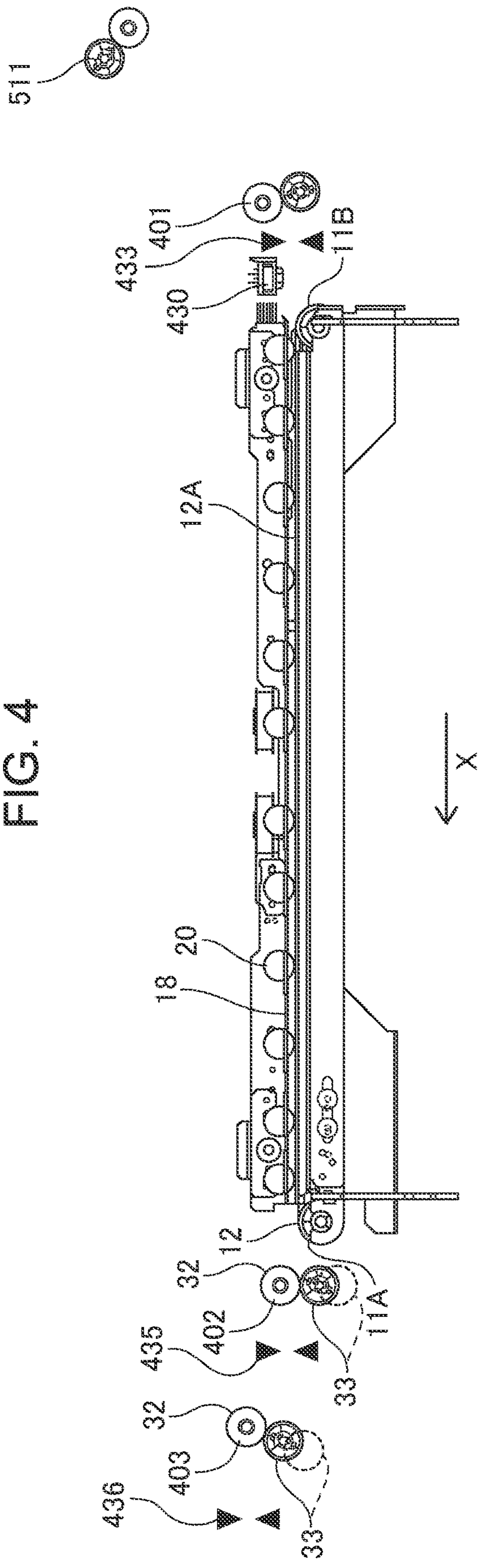
FIG. 4 is a side view of the relay conveying apparatus according to the embodiment.

As illustrated in FIG. 4, the balls 20 are placed on the conveying surface 12A in a state of being exposed from the holding holes 18A and are made freely rotatable in any direction. Each ball 20 is in contact with the conveying surface 12A by its own weight. The number of balls 20 may be determined in accordance with a required pressing force against a sheet conveyed on the conveying belt 12. The ball 20 is preferably made of a material having a comparatively low friction coefficient, such as glass or plastic, so as to allow a sheet to be conveyed while slipping on the conveying belt 12 as described later. Although the balls 20 are arranged in one row in the conveying direction X in the present embodiment, they may be arranged in a plurality of (e.g., two) rows in the conveying direction X.

Figure 5:
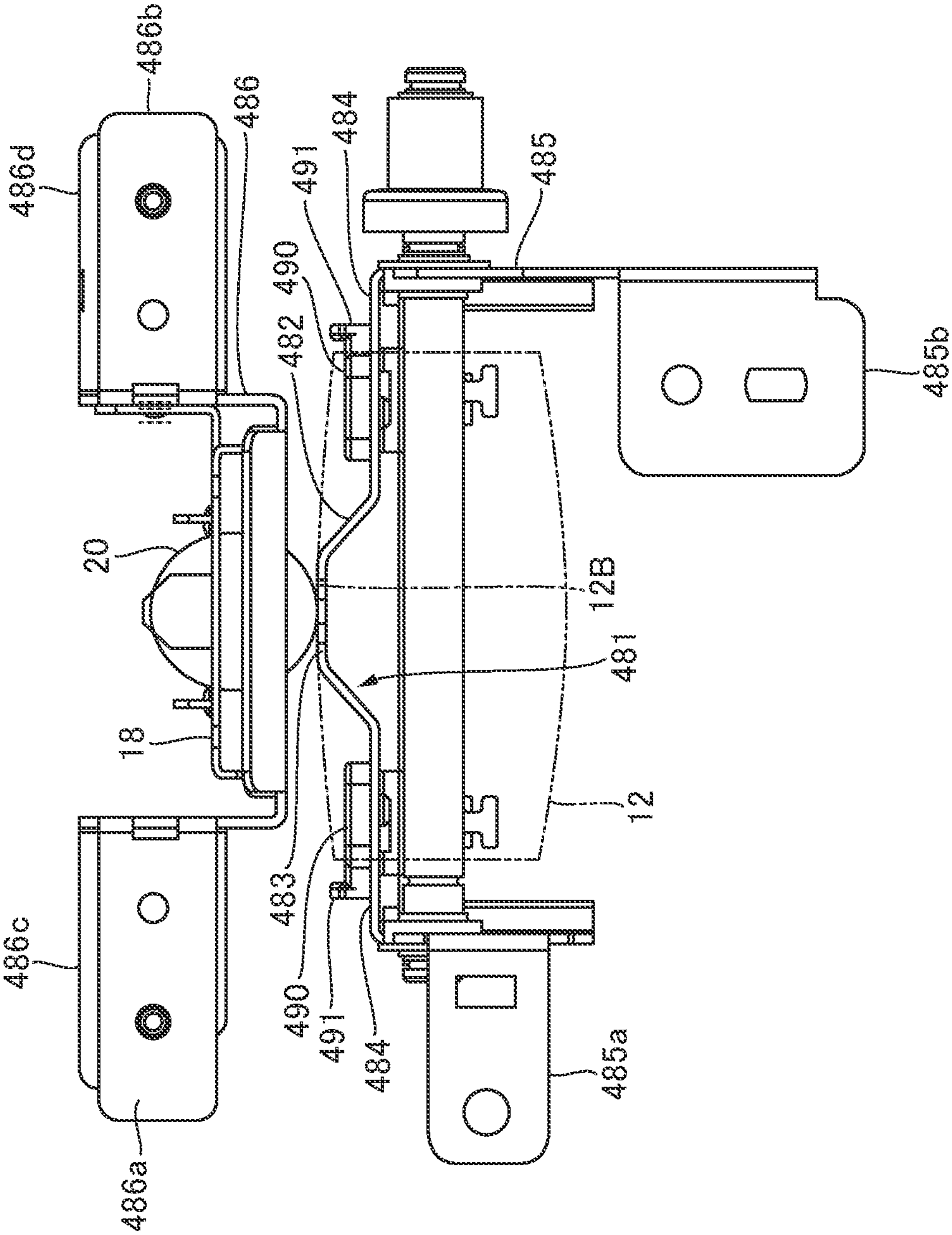
FIG. 5 is a cross-sectional view of the relay conveying apparatus according to the embodiment, focusing a portion around a configuration for supporting a conveying belt.

More detailed description will be made with reference to FIG. 5. The relay conveying apparatus 400 has the holding plate 18 that freely rotatably holds the balls 20 and a conveying belt support member 481 disposed below the holding plate 18. Like the holding plate 18, the conveying belt support member 481 is an elongated plate member extending in the conveying direction X. As illustrated in FIG. 5, the conveying belt support member 481 has a flat and relatively narrow conveying belt support surface 483. The conveying belt support surface 483 extends substantially over the entire length of the conveying belt support member 481 in the conveying direction X and has a sheet width direction center part 482 protruding upward. The conveying belt support member 481 is disposed so as to vertically face the holding plate 18 such that the balls 20 are located at the center position of the conveying belt support surface 483 in the sheet width direction.

The balls 20 are preferably disposed at the center position between the pair of regulating guides 14A and 14B and at the center position of the conveying belt support surface 483 in the sheet width direction; however, a slight displacement is negligible as long as they fall within a position facing the conveying belt support surface 483.

In the conveying belt support member 481, a side part 484 on both sides of the center part 482 in the sheet width direction protrudes slightly outside the both ends of the conveying belt 12 in the sheet width direction, and the outer end of the side part 484 is bent downward and fixed to a lower frame 485 of the relay conveying apparatus 400. The lower frame 485 has, on both sides in the conveying direction X, mounting end wall pieces 485*a* and 485*b* which extend outside in the sheet width direction and is fixed, at the mounting end wall pieces 485*a* and 485*b*, to the relay conveying apparatus 400 side (e.g., an enclosure) by appropriate stop members such as set screws. When the conveying belt 12 is supported by the thus configured conveying belt support member 481, a center part 12B of the conveying belt 12 is pushed upward by the center part 482 of the conveying belt support member 481, with the result that the distance between the vertically facing center portions of the endless conveying belt 12 is larger than the distance between the vertically facing end portions of the conveying belt 12.

As illustrated in FIG. 5, the holding plate 18 is fixed on an upper frame 486 of the relay conveying apparatus 400. The upper frame 486 has, on both ends in the conveying direction X, mounting end wall pieces 486*a*, 486*b*, 486*c*, and 486*d* which extend outside in the sheet width direction and is fixed, at the mounting end wall pieces 486*a* to 486*d*, to the relay conveying apparatus 400 side (e.g., an enclosure 470) by appropriate stop members such as set screws. As a result, the positional relationship between the holding plate 18 and the conveying belt support member 481 is held such that the balls 20 are freely rotatably held on the conveying surface 12A of the conveying belt 12 at the center position of the conveying belt support surface 483 in the sheet width direction.

The conveying belt support member 481 has, on each of the side parts 484 on the sheet width direction both sides, a plurality of blocking members 490 which are arranged in the conveying direction X. Each blocking member 490 has a shape in which the outer end thereof in the sheet width direction protrudes outside from each of the both end portions of the conveying belt 12 in the sheet width direction by a predetermined width. An outwardly facing blocking surface 491 is provided at the outer end of the blocking member 490 in the sheet width direction. For example, in jam clearance for an envelope, the flap of the envelope is engaged with the blocking surface 491, thereby preventing the flap from getting jammed in the conveying belt 12.

The pair of regulating guides 14A and 14B are disposed on both sides of the conveying belt 12 in a sheet width direction Y crossing (perpendicular to, in the present embodiment) the conveying direction X. The pair of regulating guides 14A and 14B can guide the both end edges in the width direction Y (sheet width direction both end edges) of the sheet conveyed while being nipped by the conveying belt 12 and balls 20. That is, the regulating guide 14A as a first regulating guide disposed on one side (apparatus near side) in the sheet width direction Y can guide one end edge in the width direction Y of the sheet nipped and conveyed by the conveying belt 12 and balls 20. Further, the regulating guide 14B as a second regulating guide disposed on the other side (apparatus far side) in the sheet width direction Y can guide the other end edge in the sheet width direction Y of the sheet nipped and conveyed by the conveying belt 12 and balls 20. The one side (apparatus near side) in the sheet width direction Y refers to a side where a user operates the image forming system 1000.

Figure 6:
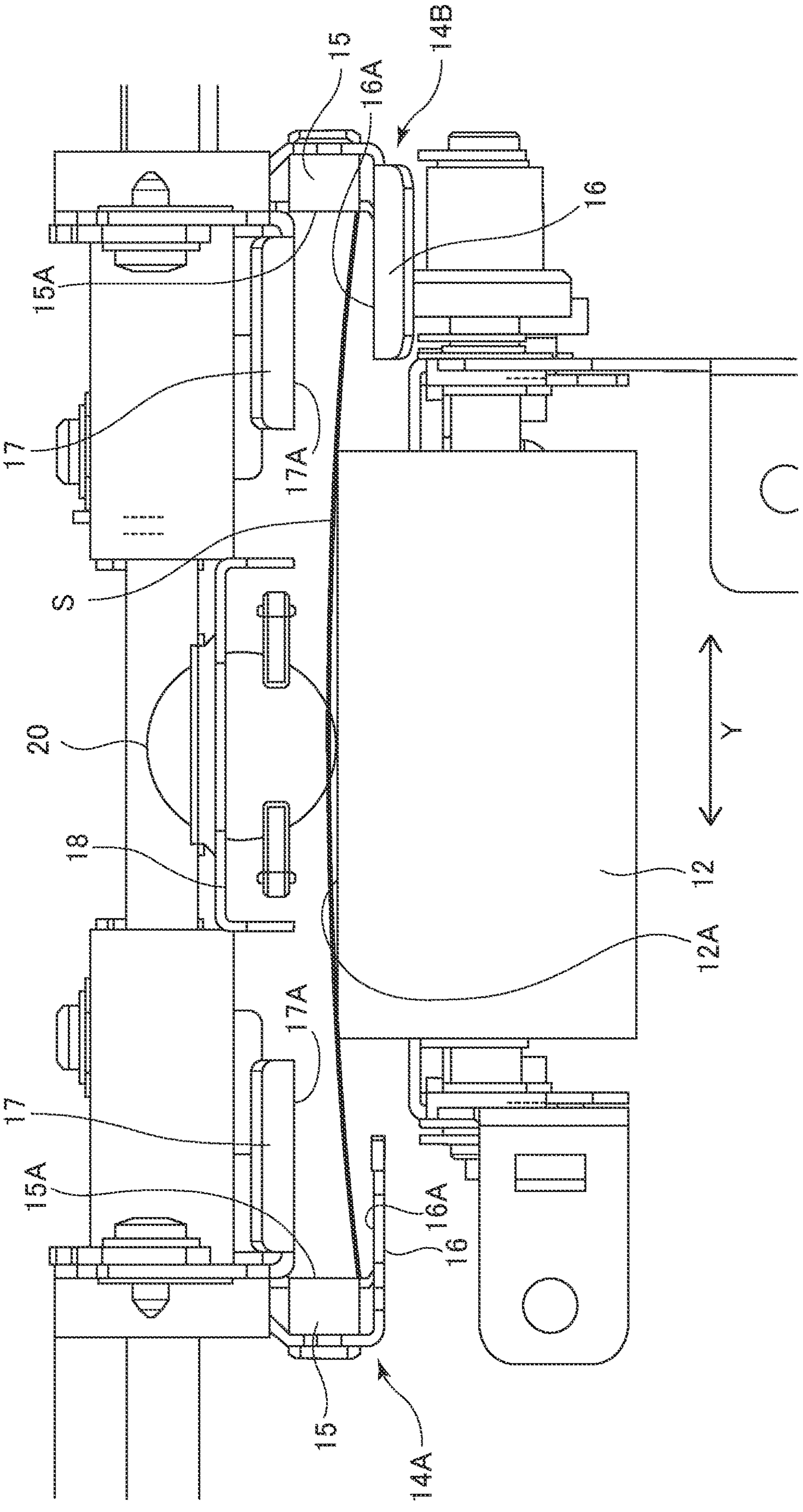
FIG. 6 is a cross-sectional view of the relay conveying apparatus according to the embodiment.

As illustrated in FIG. 6, the pair of regulating guides 14A and 14B each have a side plate part 15, a lower plate part 16, and an upper plate part 17, and the end portion of the sheet S conveyed by the conveying belt 12 can enter a space surrounded by the above plate parts 15, 16, and 17. The pair of regulating guides 14A and 14B are supported by support shafts 421A and 421B (FIG. 3) so as to be movable to a guide position (first guide position) and a retracting position (second guide position) by a guide moving part 420 to be described later. The support shafts 421A and 421B are disposed substantially parallel to the sheet width direction Y and support the end portion sides of the pair of regulating guides 14A and 14B in the conveying direction X. The pair of regulating guides 14A and 14B are movable in the sheet width direction Y along the support shafts 421A and 421B.

The side plate part 15 has a guide surface 15A facing, at the guide position, the end edge in the sheet width direction Y of the sheet S conveyed while being nipped by the conveying belt 12 and balls 20. The guide surface 15A is disposed parallel to the conveying direction X. Further, the guide surface 15A is a surface perpendicular to both the conveying direction X and the sheet width direction Y (in the present embodiment, the guide surface 15A is a surface extending substantially vertically).

The lower plate part 16 is disposed so as to be perpendicular to the side plate part 15 and has a support surface 16A that can support, at the guide position, one end edge in the width direction Y of the sheet S conveyed while being nipped by the conveying belt 12 and balls 20. The support surface 16A extends substantially horizontally from the lower end portion of the guide surface 15A in the vertical direction. Further, the support surface 16A is positioned vertically below the conveying surface 12A of the conveying belt 12.

Assume here that the support surface 16A and the conveying surface 12A are positioned at the same height, or that the support surface 16A is positioned vertically above the conveying surface 12A. In this case, when a sheet S having high rigidity, such as a cardboard, is conveyed to between the conveying belt 12 and the balls 20 in a downwardly curled state (a state where both end edges of the sheet S in the width direction Y are positioned lower than the center portion) as illustrated in FIG. 6, the both end edges of the sheet S in the width direction Y are supported on the support surface 16A. At this time, the center portion of the sheet S in the width direction Y is lifted (swelling upward) to push upward the balls 20. As a result, the conveying belt 12 and the balls 20 are separated to prevent the conveying force of the conveying belt 12 from being transmitted to the sheet S, which may result in a conveyance failure. To avoid this, in the present embodiment, the support surface 16A is disposed vertically below the conveying surface 12A of the conveying belt 12.

The upper plate part 17 has a facing surface 17A that faces the support surface 16A. The facing surface 17A is positioned, at the guide position, above the end edge in the sheet width direction Y of the sheet S conveyed while being nipped by the conveying belt 12 and the balls 20. The facing surface 17A is formed substantially parallel to the support surface 16A.

As illustrated in FIGS. 2 and 3, the guide moving part 420 as a guide moving unit has a first moving part 420A for moving the regulating guide 14A and a second moving part 420B for moving the regulating guide 14B. The guide moving part 420 further has a motor M2 that generates a drive force for moving the regulating guide 14A and a motor M3 that generates a drive force for moving the regulating guide 14B.

The first moving part 420A has a pair of pulleys 422A, 423A, an endless belt 424A wound over the pulleys 422A and 423A, and a connection part 425A connecting the belt 424A and the regulating guide 14A. Similarly, the second moving part 420B has a pair of pulleys 422B, 423B, an endless belt 424B wound over the pulleys 422B and 423B, and a connection part 425B connecting the belt 424B and the regulating guide 14B.

Further, as illustrated in FIG. 2, the first moving part 420A is driven by the motor M2 as a drive source, and the second moving part 420B is driven by the motor M3 as a drive source. That is, in the present embodiment, the motors as drive sources for driving the pair of regulating guides 14A and 14B are separately provided to allow the pair of regulating guides 14A and 14B to move independently. Thus, the pulley 422A of the first moving part 420A is coupled to a pulley 427A through a coupling shaft 426A, and a belt 428A is wound over the pulley 427A and a pulley driven into rotation by the motor M2. As a result, the rotation drive of the motor M2 is transmitted to the belt 424A through the belt 428A, pulley 427A, coupling shaft 426A, and pulley 422A. As described above, the belt 424A is connected with the regulating guide 14A through the connection part 425A, so that when the motor M2 is driven, the regulating guide 14A moves in the sheet width direction Y along the support shafts 421A and 421B.

Similarly, the pulley 422B of the second moving part 420B is coupled to a pulley 427B through a coupling shaft 426B, and a belt 428B is wound over the pulley 427B and a pulley driven into rotation by the motor M3. As a result, the rotation drive of the motor M3 is transmitted to the belt 424B through the belt 428B, pulley 427B, coupling shaft 426B, and pulley 422B. As described above, the belt 424B is connected with the regulating guide 14B through the connection part 425B, so that when the motor M3 is driven, the regulating guide 14B moves in the sheet width direction Y along the support shafts 421A and 421B.

The motors M2 and M3 are thus driven to thereby move the regulating guides 14A and 14B to the guide position or retracting position. In the present embodiment, the motors M2 and M3 are each a pulse motor (stepping motor), and the positions of the regulating guides 14A and 14B are controlled by the number of pulses given to the motors. The regulating guides 14A and 14B have their respective home positions, where sensors for detecting the regulating guides 14A and 14B are provided. Thus, the regulating guides 14A and 14B are detected at the home positions and then each moved to the guide position or retracting position according to the number of pulses given to the motors.

In the present embodiment, the home position of each of the regulating guides 14A and 14B and a maximum width-sized sheet receiving position thereof coincide with each other. That is, the regulating guides 14A and 14B can each basically move to the home position, a standby position (sheet receiving position), and a guide position. The guide position is, although differing depending on the sheet size, a position 0.5 mm from the end portion of the sheet in the sheet width direction Y, for example. Normally, the distance between the regulating guides 14A and 14B is reduced in the order of home position, standby position, and guide position. However, in the present embodiment, for a sheet having a maximum width (e.g., 330.2 mm=length in the sheet width direction Y), the home position and standby position coincide with each other. This reduces the apparatus size.

That is, when receiving the maximum width-sized sheet, the regulating guides 14A and 14B are controlled as follows. First, based on a detection result of the sensor for detecting the home position, the regulating guides 14A and 14B are each located at the home position, where the sheet is received (that is, the home position is set as the standby position). Then, the regulating guides 14A and 14B are each located at the guide position to regulate the sheet. Further, for receiving the next sheet, the regulating guides 14A and 14B are each located at the standby position (=home position). At this time, the output of the home position sensor is ignored. That is, after the first sheet has passed through the home position sensor, the position of each of the regulating guides 14A and 14B is managed based on the pulse count. When a sheet having a different width is conveyed after completion of one job, the regulating guides 14A and 14B are each located at an appropriate standby position by referring once again to the output of the home position sensor.

In the present embodiment, the motor M1 for driving the conveying belt 12, motors M2 and M3 for moving the regulating guides 14A and 14B, and motors M5, M7, and M8 to be described later are disposed on the side of the regulating guide 14B. In particular, a motor within the sheet conveying range of the displacement correction part 410 in the conveying direction X is preferably disposed on the far side (rear side, i.e., regulating guide 14B side) than the conveying belt 12. This is for facilitating removal of a jammed sheet from the near side (front side, i.e., regulating guide 14A side), in the case of the present embodiment.

Further, in the present embodiment, as illustrated in FIGS. 3 and 4, a multi-feed detection sensor 430 for detecting multi-feed of the sheet is disposed between the conveying roller pair 401 positioned on the upstream side and the conveying belt 12. The multi-feed detection sensor 430 is a sensor for detecting a state where two or more sheets are conveyed in an overlapping manner by means of ultrasound. When the multi-feed detection sensor 430 detects the multi-feed, the control part 203 (FIG. 1) of the multi-stage feeder 200 conveys the multi-fed sheets to the multi-fed sheet storage part 218 through the relay conveying apparatus 400 and conveyance paths 215 and 217.

Further, as illustrated in FIG. 4, the relay conveying apparatus 400 according to the present embodiment has a plurality of sheet detection sensors 433, 435, and 436 in order to detect sheet jam. The sheet jam refers to a phenomenon in which a sheet conveying path is clogged with a sheet to impede sheet conveyance. The sheet detection sensor 433 detects a sheet conveyed by the conveying roller pair 401 at the upstream side of the conveying belt 12. The sheet detection sensor 435 is disposed between the conveying roller pair 402 and the conveying roller pair 403 and detects a sheet conveyed by the conveying roller pair 402. The sheet detection sensor 436 is disposed downstream from the conveying roller pair 403 and detects a sheet conveyed by the conveying roller pair 403.

The control part 203 (FIG. 1) of the multi-stage feeder 200 determines whether a sheet jam has occurred on the conveying path based on a detection signal from various sheet detection sensors (433, 435, 436, etc.). When determining the occurrence of a sheet jam, the control part 203 stops sheet conveyance and displays information indicating the occurrence of sheet jam and jammed location on a display part such as a liquid crystal panel provided in the image forming system 1000. At this time, the control part 203 prompts an operator (user, serviceman, etc.) to open a cover at the corresponding location.

Further, in the present embodiment, as illustrated in FIG. 3, facing members 450 and 460 that face the lower surface of a sheet conveyed by the conveying belt 12 are disposed between the conveying belt 12 and the pair of regulating guides 14A and 14B in the sheet width direction Y. The facing members 450 and 460 each support the end portion of a sheet which has been conveyed without being supported by any one of the regulating guides 14A and 14B.

The thus configured relay conveying apparatus 400 nips a sheet passed from the conveying roller pair 401 on the upstream side in the conveying direction X to the conveying belt 12 by the conveying belt 12 and balls 20 and then conveys the sheet by rotation of the conveying belt 12. At this time, although the details will be described later, both ends in the sheet width direction Y of the sheet conveyed by the conveying belt 12 are made to abut against guide surfaces 15A of the pair of regulating guides 14A and 14B. After abutting against the guide surfaces 15A, the sheet is conveyed in a direction parallel to the guide surfaces 15A while slipping on the conveying belt 12 with the both ends thereof following the guide surfaces 15A. The balls 20, which nip the sheet with the conveying belt 12 in this state, are rotatable in any direction, thus allowing the sheet to move in any direction while slipping on the conveying belt 12. With this configuration, the side registration and side skew of the sheet are corrected.

[Regulating Guide]

The following describes the detailed configuration of the regulating guide 14A as a first regulating guide and the regulating guide 14B as a second regulating guide, with reference to FIGS. 7A to 7D. Since the regulating guides 14A and 14B have the same configuration, FIGS. 7A to 7D only illustrate the regulating guide 14A. As illustrated in FIG. 6, the regulating guide 14A has the side plate part 15 having the guide surface 15A, the lower plate part 16 having the support surface 16A, and the upper plate part 17 having the facing surface 17A.

As illustrated in FIGS. 7A and 7B, the lower plate part 16 and upper plate part 17 are continuously formed substantially over the entire area of the regulating guide 14A in the longitudinal direction thereof. The regulating guide 14A is disposed substantially parallel to the conveying direction X as illustrated in FIG. 2 and other figures, and a range where the lower plate part 16 and upper plate part 17 are continued in the conveying direction X is defined as a predetermined area A. Thus, in the present embodiment, the support surface 16A of the lower plate part 16 and the facing surface 17A of the upper plate part 17 are continuously formed over the entire predetermined area A in the conveying direction X. The predetermined area A corresponds to substantially the entire area to which a sheet is conveyed by the displacement correction part 410.

On the other hand, the side plate part 15 is formed over the entire guide area B which is shorter in length than the predetermined area A as illustrated in FIGS. 7A to 7C. In the present embodiment, the upstream end (conveying direction upstream end) B1 of the side plate part 15 in the conveying direction X is positioned downstream relative to an upstream endA1 of the predetermined area A in the conveying direction X. That is, the upstream end B1 of the guide surface 15A of the side plate part 15 in the conveying direction X is positioned downstream relative to the upstream endA1 of the predetermined area A. The guide surface 15A is continuously formed up to a downstream end A2 of the predetermined area A in the conveying direction X. Thus, the position of a downstream end B2 of the side plate part 15 in the conveying direction X and the position of the downstream end A2 of the predetermined area A in the conveying direction X are substantially the same in the conveying direction X.

In the present embodiment, a cutout part 19C is formed upstream from the upstream end B1 of the side plate part 15. An outer plate part 19 positioned outside the side plate part 15 in the sheet width direction Y is disposed at a part of the cutout part 19C. The outside in the sheet width direction Y refers to a side separated from the conveying belt 12 in the sheet width direction Y. Thus, as illustrated in FIG. 7C, an inner surface 19A of the outer plate part 19 is positioned outside the guide surface 15A which is the inner surface of the side plate part 15 in the sheet width direction Y. Further, an inclined plate part 19B inclined so as to be closer to the side plate part 15 as it goes further downstream is formed between the outer plate part 19 and the side plate part 15 in the conveying direction X.

In the thus configured pair of regulating guides 14A and 14B, the distance in the width direction Y between the inner surfaces 19A of the outer plate parts 19 on the upstream side in the conveying direction X is larger than the distance in the width direction Y between the guide surfaces 15A of the side plate part 15. Thus, although the details will be described later, in the course of conveyance, the both end edges in the width direction Y of a sheet passed from the conveying roller pair 401 on the upstream side to the conveying belt 12 are positioned between the inner surfaces 19A on the upstream side in the conveying direction X and then positioned between the guide surfaces 15A on the downstream side.

The outer plate part 19 and/or inclined plate part 19B may be omitted. However, if the end portion in the sheet width direction Y of the sheet passed from the conveying roller pair 401 positioned on the upstream side to the conveying belt 12 is positioned in the cutout part 19C, it may be caught at the upstream end B1 of the side plate part 15 in the subsequent course of conveyance. Thus, in the present embodiment, the outer plate part 19 and the inclined plate part 19B are provided, so that even when a sheet is displaced in the width direction Y from a proper position during conveyance, the position of the displaced sheet can be regulated by the outer plate part 19, and the end portion of the sheet can be guided to the guide surface 15A of the side plate part 15 by the inclined plate part 19B.

[Contact/Separation Mechanism of Conveying Roller Pair]

Figure 8:
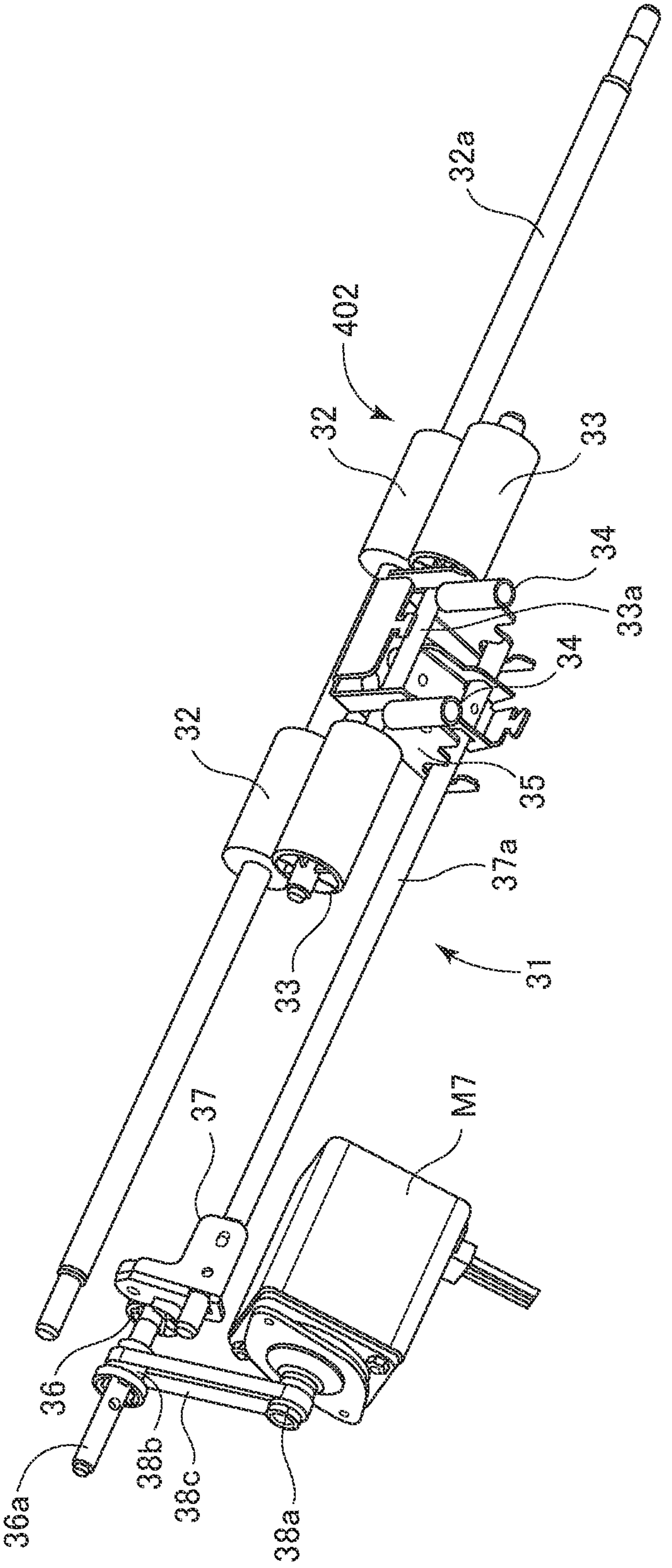
FIG. 8 is a perspective view illustrating a contact/separation mechanism of a conveying roller pair according to the embodiment.
Figure 9A:
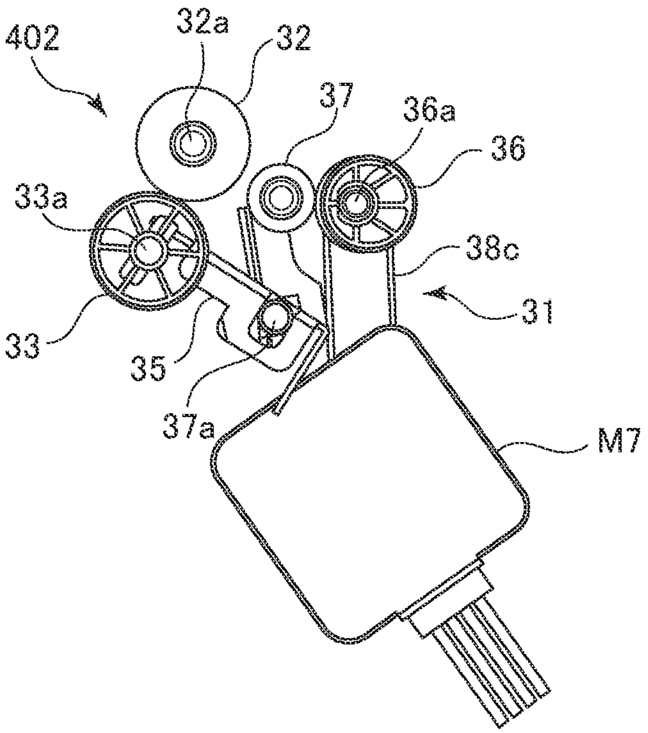
Figure 9B:
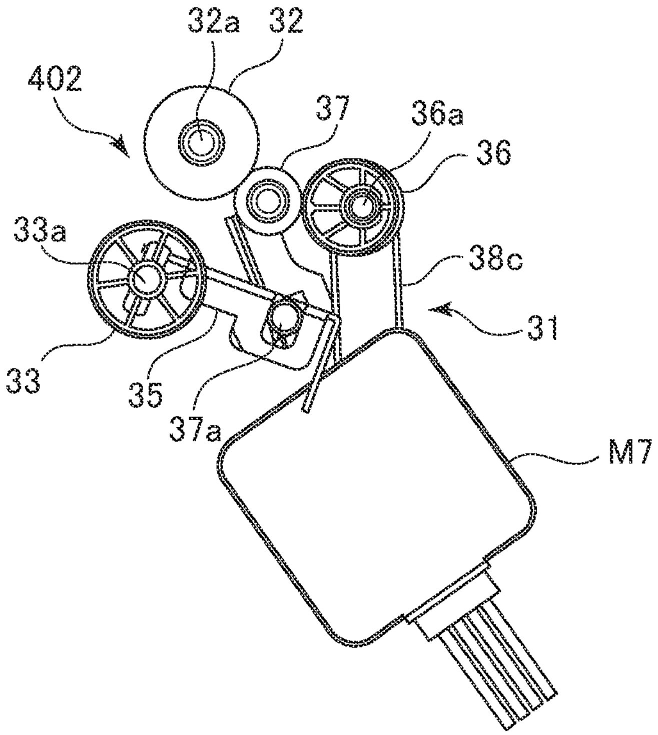

The following describes a contact/separation mechanism of the conveying roller pairs 401 to 403 with reference to FIGS. 8, 9A and 9B. As described above, the conveying roller pairs 401 to 403 are disposed upstream (401) and downstream (402, 403) relative to the conveying belt 12 in the conveying direction X. The conveying roller pairs 401 to 403 each have a pair of conveying rollers including a drive roller 32 and a driven roller 33. The drive roller 32 is an elastic roller obtained by providing an elastic body such as rubber around a rotary shaft 32*a*. The driven roller 33 contacts the drive roller 32 to form a nip portion for nipping and conveying a sheet with the drive roller 32. The drive roller 32 of the conveying roller pair 401, the drive roller 32 of the conveying roller pair 402, and the drive roller 32 of the conveying roller pair 403 can be driven into rotation independently by the motor M4, the motor M5, and the motor M6, respectively.

In the present embodiment, the conveying roller pairs 402 and 403 disposed downstream (conveying direction downstream side) from the conveying belt 12 in the conveying direction X have a configuration allowing the drive roller 32 and the driven roller 33 to contact and separate from each other. The drive roller 32 and driven roller 33 of the conveying roller pair 402 and those of the conveying roller pair 403 can independently be made to contact and separate from each other by the motor M7 and the motor M8, respectively. Since the conveying roller pairs 402 and 403 have the same configuration, the following description will be made taking the conveying roller pair 402 as a representative example.

A contact/separation mechanism 31 for contact and separation of the drive roller 32 and driven roller 33 has a compression spring 34 as a biasing means, a support member 35, the motor M7, a separation cam 36, and a link member 37. The contact/separation mechanism 31 corresponds to a roller moving means that can move at least one of the pair of conveying rollers, i.e., the driven roller 33, to a nip position where the pair of conveying rollers can be brought into a nip state for sheet conveyance and a nip release position where the pair of conveying rollers are separated from the nip position.

The compression spring 34 is a spring for biasing the driven roller 33 toward the drive roller 32. The support member 35 supports a rotary shaft 33*a* of the driven roller 33 and is swingably supported about a swing shaft 37*a*. Further, the support member 35 is biased by the compression spring 34 in a direction pressing the driven roller 33 against the drive roller 32 about the swing shaft 37*a*. The support member 35 is fixed to the swing shaft 37*a* and rotates together therewith to move the driven roller 33 in directions toward and away from the drive roller 32.

The motor M7 drives the separation cam 36 into rotation through pulleys 38*a*, 38*b* and a belt 38*c*. The pulley 38*a* is fixed to the drive shaft of the motor M7, and the pulley 38*b* is fixed to a rotary shaft 36*a* of the separation cam 36. The belt 38*c* is an endless belt wound over the pulleys 38*a* and 38*b*. The separation cam 36 is an eccentric cam whose center of the outer peripheral surface is eccentric to the center of the rotary shaft 36*a* and rotates together with the rotary shaft 36*a* by receiving drive from the motor M7.

The link member 37 is fixed to the swing shaft 37*a* and swingable together therewith. Thus, the link member 37 rotates in sync with the support member 35 through the swing shaft 37*a*. The link member 37 is disposed so as to contact the separation cam 36 by the support member 35 biased by the compression spring 34.

When the separation cam 36 is in a phase illustrated in FIG. 9A, the driven roller 33 is brought into pressure contact with the drive roller 32 by the biasing force of the compression spring 34. This is the nip position illustrated in FIG. 9A. When the separation cam 36 is rotated by, e.g., 180° by the motor M7 in this state, the link member 37 is pushed by the separation cam 36 to swing in the counterclockwise direction in FIG. 9B about the swing shaft 37*a*, as illustrated in FIG. 9B. Then, the support member 35 coupled to the link member 37 through the swing shaft 37*a* swings in the same direction about the swing shaft 37*a*. The driven roller 33 is supported by the support member 35 through the rotary shaft 33*a* and is thus separated from the drive roller 32 by the swing of the support member 35. That is, the driven roller 33 is moved to the nip release position.

To move the driven roller 33 from the nip release position to the nip position, the separation cam 36 is further rotated by 180° by the motor M7 in the state of FIG. 9B. The contact/separation mechanism for contact and separation of the drive roller 32 and driven roller 33 may be configured to move both the drive roller 32 and driven roller 33. Further, although the separation/contact mechanism is driven by means of the motor in the above example, another drive source such as a solenoid may be used for contact and separation of the pair of conveying rollers.

Further, although both the conveying roller pairs 402 and 403 positioned downstream relative to the conveying belt 12 in the conveying direction X are configured to be able to contact and separate from each other in the above example, only the conveying roller pair 402 may be so configured. Further alternatively, the conveying roller pair 401 positioned upstream relative to the conveying belt 12 in the conveying direction X may be so configured. In this case, the conveying roller pair 401 alone may be so configured or the conveying roller pair 402 and/or 403 positioned on the downstream side may be so configured as well.

[Sheet Conveying Operation]

Figure 10:
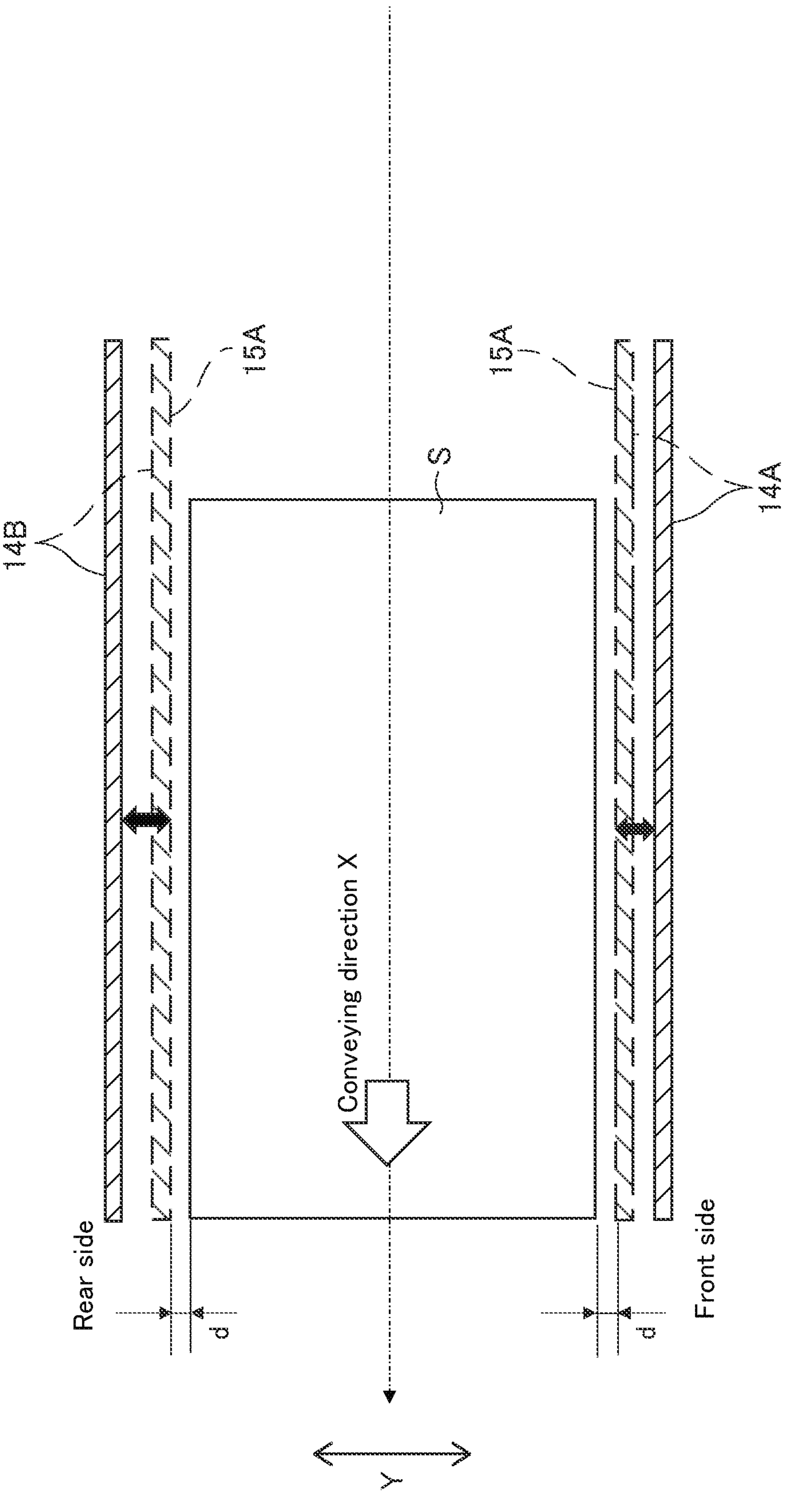
FIG. 10 is a view for explaining the operation of the regulating guide according to the embodiment.
Figure 11:
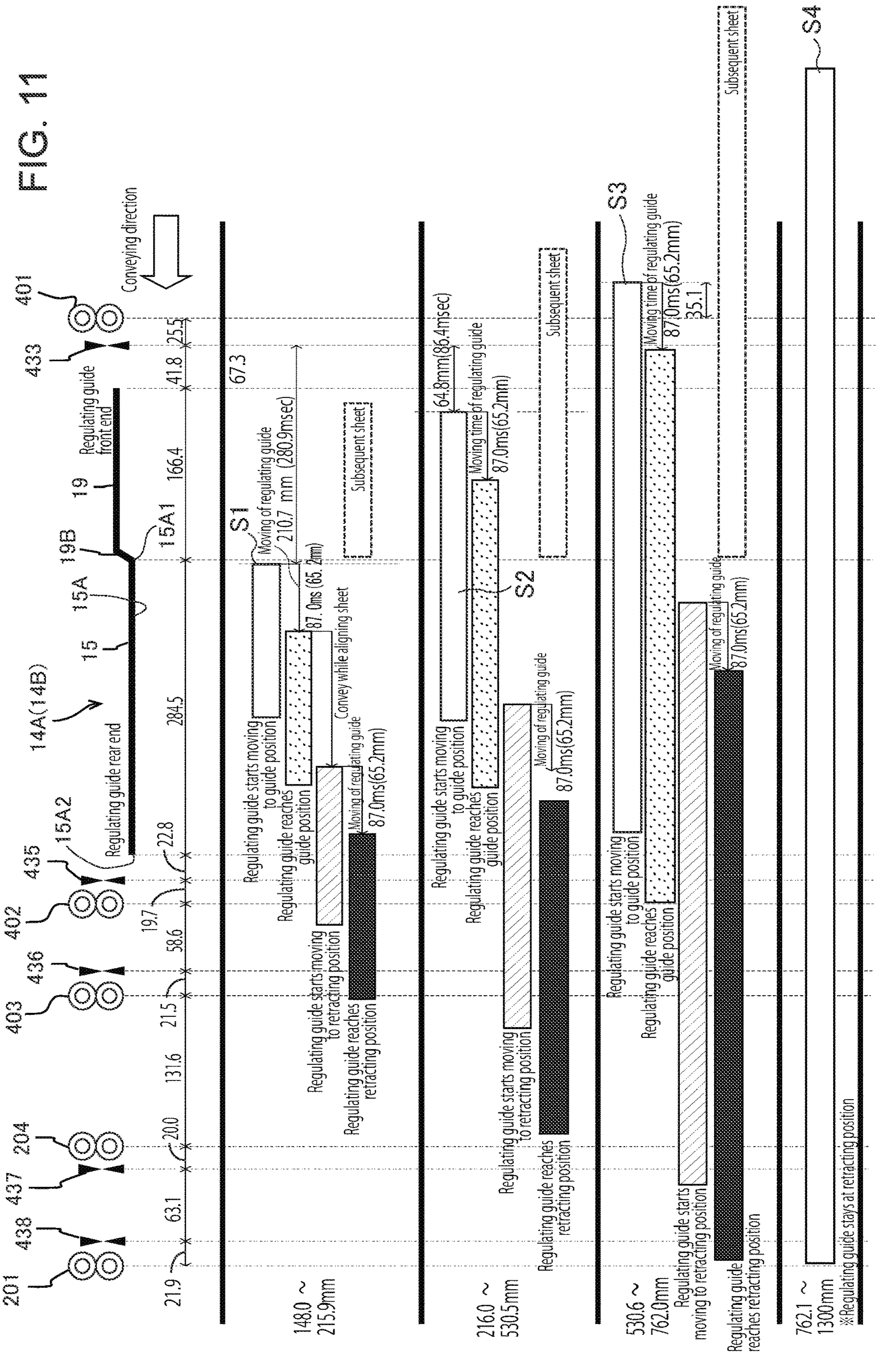
FIG. 11 is a view for explaining the operation timing of the regulating guide for sheets of various lengths.

The following describes a sheet conveying operation in the relay conveying apparatus 400 according to the present embodiment with reference to FIGS. 10 and 11, as well as FIGS. 2, 3, and 6. In the present embodiment, the control part 203 (FIG. 1) controls the motors M2 and M3 (FIG. 2) according to the length of a sheet in the conveying direction X to change the positions of the pair of regulating guides 14A and 14B in the sheet width direction Y. As described above, the control part 203 controls the motors M2 and M3 to drive the guide moving part 420 (FIG. 2) to thereby move each of the regulating guides 14A and 14B to a guide position and retracting position. In FIG. 10, the pair of regulating guides 14A and 14B located at the retracting position is denoted by a solid line, and those located at the guide position is denoted by a dashed line. First, the guide position and retracting position will be described using FIG. 10.

[Guide Position (First Guide Position)]

The guide position as the first guide position is a position at which the guide surfaces 15A of the pair of regulating guides 14A and 14B can each guide the end edge in the width direction Y of the sheet S conveyed while being nipped by the conveying belt 12 and balls 20. That is, the guide position is a position at which the end edges in the width direction Y of the sheet S conveyed while being nipped by the conveying belt 12 and balls 20 can be supported by the support surfaces 16A and guided by the guide surfaces 15A. In the present embodiment, the guide position is a position at which the distance between the guide surfaces 15A of the pair of regulating guides 14A and 14B is larger than the length in the width direction Y of the sheet S conveyed while being nipped by the conveying belt 12 and balls 20.

More specifically, the guide position is a position where when a sheet S is conveyed such that the center position of the sheet S in the sheet width direction Y and the center position between the guide surfaces 15A on both sides coincide with each other and that the end edge of the sheet S in the sheet width direction Y is parallel (center reference) to the guide surface 15A, the end edge of the sheet S in the sheet width direction Y and the guide surface 15A are separated by a predetermined distance d. The predetermined distance d can be set appropriately for each apparatus, and a misalignment between the sheet S and an image formed thereon due to displacement of the sheet S in the predetermined distance is within an allowable range. The predetermined distance d is, e.g., 0.5 mm. That is, the guide surfaces 15A of the pair of regulating guides 14A and 14B set at the guide position are separated by 0.5 mm from the end edges of the sheet S in the sheet width direction Y. The control part 203 can appropriately set the guide position in accordance with sheet size.

As described above, the pair of regulating guides 14A and 14B is located at the guide position at which the distance between the guide surfaces 15A thereof is larger than the length of the sheet in the sheet width direction Y, so that a conveying load of the sheet conveyed by the conveying belt 12 can be reduced. For example, in a case where the distance between the guide surfaces 15A is set equal to the length of the sheet in the sheet width direction Y, the sheet is conveyed while the end portion thereof is rubbed against the guide surface, which may increase a conveying resistance. In particular, in the present embodiment, the sheet is conveyed while being nipped by the conveying belt 12 and balls 20, i.e., with a low nip pressure. Thus, when the conveying resistance of the sheet is large, a conveyance failure such as a delay or stoppage of sheet conveyance may be likely to occur. Thus, in the present embodiment, the pair of regulating guides 14A and 14B are positioned as above at the first guide position so as to reduce the sheet conveying resistance.

It is preferable to correct side registration and side skew of the sheet (to perform sheet alignment operation) as will be described later by conveying the sheet on a center reference basis as described above. This is because, in the present embodiment, the side skew of the sheet is corrected with the sheet rotated slipping between the conveying belt 12 and the balls 20. That is, by starting the alignment operation at a position (center reference) where the center of gravity of the sheet S and the center between the pair of regulating guides 14A and 14B substantially coincide with each other, damage to the sheet during the alignment operation can be reduced.

[Retracting Position (Second Guide Position)]

The retracting position as the second guide position is, as denoted by the solid line in FIG. 10, a position at which the guide surfaces 15A of the pair of regulating guides 14A and 14B retract (separate) respectively further away from the end edges of the sheet in the sheet width direction Y than at the guide position. In other words, the distance in the sheet width direction Y between the guide surfaces 15A of the pair of regulating guides 14A and 14B at the retracting position is larger than the distance in the width direction Y between the guide surfaces 15A of the pair of regulating guides 14A and 14B at the guide position. That is, the retracting position is a position at which the end edges of the sheet S in the width direction Y can be supported by the support surfaces 16A and retracting further away from the both end edges of the sheet S in the width direction Y than the guide position.

In the present embodiment, the retracting position is located at a position at which the regulating guide 14A on the near side (F (front)-side) is separated from the end edge in the width direction Y of the sheet conveyed on a center reference basis by 6.5 mm and the regulating guide 14B on the far side (R (rear)-side) is separated from the end edge in the width direction Y of the sheet conveyed on a center reference basis by 6 mm. That is, at the retracting position, the distance between the guide surface 15A of the regulating guide 14A on one side and one end edge of the sheet in the sheet width direction Y and the distance between the guide surface 15A of the regulating guide 14B on the other side and the other end edge of the sheet in the sheet width direction Y differ from each other.

As described above, the distanced between the pair of regulating guides 14A and 14B and the end edges of the sheet in the width direction Y at the guide position is 0.5 mm (same on both sides). Accordingly, the amount of movement of the regulating guide 14A on the near side from the retracting position to the guide position is 6.0 mm, and the amount of movement of the regulating guide 14B on the far side from the retracting position to guide position is 5.5 mm. Thus, the regulating guide 14A on the near side and the regulating guide 14B on the far side move from the retracting position to the guide position by different distances. Alternatively, at the retracting position, the distance between the guide surface 15A of the regulating guide 14A on one side and the one end edge of the sheet and the distance between the guide surface 15A of the regulating guide 14B on the other side and the other end edge of the sheet may be the same.

[Operation Timing of Regulating Guide According to Sheet Length]

The following describes the operation timing of the pair of regulating guides 14A and 14B according to the sheet length using FIG. 11. In the topmost row of FIG. 11, there is schematically illustrated the positional relation of the regulating guide 14A (14B), various conveying roller pairs, and various sheet detection sensors in the conveying direction X from the conveying roller pair 401 upstream of the conveying belt 12 to the conveying roller pair 201 (FIG. 1) of the multi-stage feeder 200. Below the topmost row, there is schematically illustrated the operation timing of the regulating guide according to the sheet length.

As illustrated in the schematic view of the topmost row, a conveying roller pair 204 and sheet detection sensors 437 and 438 are disposed between the conveying roller pair 403 and the conveying roller pair 201. Further, as the regulating guide 14A (14B), the side plate part 15 having an outer plate part 19, an inclined plate part 19B, and the guide surface 15A is schematically illustrated. In addition, the positional relation between the above members in the conveying direction is illustrated together with the lengths therebetween. The unit of the length is "mm".

Bars depicted below the schematic view of the topmost row (in the second and subsequent rows) indicate, respectively, sheets S1, S2, S3, and S4 having mutually different lengths. The sheet S1 depicted in the second row is a sheet having a length of 148.0 mm or more and 215.9 mm or less, and the bar represents a sheet of 148.0 mm as the sheet S1. The sheet S2 depicted in the third row is a sheet having a length of 216.0 mm or more and 530.5 mm or less, and the bar represents a sheet of 297.1 mm as the sheet S2. The sheet S3 depicted in the fourth row is a sheet having a length of 530.6 mm or more and 762.0 mm or less, and the bar represents a sheet of 530.6 mm as the sheet S3. The sheet S4 depicted in the lowermost row is a sheet having a length of 762.1 mm or more and 1300 mm or less, and the bar represents a sheet of 1300 mm as the sheet S4.

The lengths of the bars of FIG. 11 each correspond to the actual sheet length, and the positions thereof each correspond to the actual position in the conveying direction X of the sheet at each operation timing of the regulating guide. The bars denoted by a solid line each represent the position at which the regulating guides 14A and 14B start moving from the retracting position to the guide position. The dotted bars each represent the position at which the regulating guides 14A and 14B reach the guide position. The hatched bars each represent the position at which the regulating guides 14A and 14B start moving from the guide position to the retracting position. The black bars each represent the position at which the regulating guides 14A and 14B reach the retracting position. The bars denoted by a dashed line each represent the position of a subsequent sheet upon arrival of the regulating guides 14A and 14B at the retracting position. For the sheet S4 depicted in the lowermost row, the regulating guides 14A and 14B stay at the retracting position.

In the present embodiment, when the sheet is passed from the conveying roller pair 401 as a conveying unit and an upstream side conveying roller pair to the conveying belt 12, the guide moving part 420 makes the pair of regulating guides 14A and 14B reach the guide position after at least the front end of the sheet is passed to the conveying belt 12 and the sheet is completely separated from the conveying roller pair 401. Specifically, the sheet is passed from the conveying roller pair 401 to the conveying belt 12 in a state where the regulating guides 14A and 14B are at the retracting position. That is, while the sheet is being conveyed by the conveying roller pair 401, the front end thereof reaches the conveying belt 12. In this state, vertical movement of the sheet is regulated by the support surface 16A and facing surface 17A. Thus, even if the sheet is curled, the both end edges of the sheet can be made to fall within an area surrounded by the guide surface 15A, support surface 16A, and facing surface 17A during the time when the regulating guides 14A and 14B are moving from the retracting position to the guide position.

As described above, in the present embodiment, when the sheet is conveyed from the upstream side conveying roller pair 401 to the conveying belt 12, the pair of regulating guides 14A and 14B are moved to the retracting position. This is because, if the pair of regulating guides 14A and 14B are at the guide position when the sheet is passed to the conveying belt 12, the end portion of the sheet may interfere with any of the regulating guides 14A and 14B due to skew or displacement, if any, of the sheet in the width direction Y to cause a conveyance failure of the sheet S.

Then, the control part 203 moves the pair of regulating guides 14A and 14B from the retracting position to the guide position after the rear end (upstream end) of the sheet passed from the conveying roller pair 401 to the conveying belt 12 completely passes the conveying roller pair 401. That is, the guide moving part 420 makes the pair of regulating guides 14A and 14B reach the guide position after the rear end of the sheet conveyed while being nipped by the conveying belt 12 and the balls 20 passes the upstream side conveying roller pair 401. In other words, the pair of regulating guides 14A and 14B are made to reach the guide position after the sheet is completely separated from the conveying roller pair 401. In the present embodiment, as represented by the dotted bars depicted in FIG. 11, the timing at which the regulating guides 14A and 14B complete movement to (reach) the guide position is changed according to the sheet length.

[Timing at Which Regulating Guide Reach Guide Position]

The following describes the timing at which the regulating guides 14A and 14B reach the guide position according to the sheet length. For the sheets S1 and S2 having a first length, the guide moving part 420 locates the pair of regulating guides 14A and 14B at the retracting position when the sheet S1 or S2 is passed from the upstream side conveying roller pair 401 as the conveying unit and upstream side conveying roller pair to the conveying belt 12. Thereafter, the guide moving part 420 makes the pair of regulating guides 14A and 14B complete its movement from the retracting position to the guide position, i.e., reach the guide position in a state where the front end of the sheet S1 or S2 conveyed while being nipped by the conveying belt 12 and balls 20 is located between an upstream end 15A1 of the guide surface 15A in the conveying direction X and a downstream end 15A2 thereof.

In the present embodiment, the first sheet length is 148.0 mm or more and 530.5 mm or less (for the sheet S1 and S2 in second and third rows). Unexceptionally, for the sheet S1 having the first length shorter than the length (284.5 mm) of the guide surface 15A in the conveying direction X by a predetermined amount, the guide moving part 420 makes the pair of regulating guides 14A and 14B reach the guide position in a state where the sheet S1 is located between the upstream end 15A1 of the guide surface 15A in the conveying direction X and the downstream end 15A2 thereof. That is, since the sheet S1 (148.0 mm to 215.9 mm) in the second row shown in FIG. 11 is shorter in length than the guide surface 15A, it is possible to make the regulating guides 14A and 14B reach the guide position in a state where the end edge of the sheet S1 in the width direction Y faces the guide surface 15A. When the front and rear ends of the sheet S1 are thus simultaneously regulated, the sheet S1 shows a rotating behavior about the center thereof, thereby facilitating correction of side registration and side skew of the sheet S1.

The conveying roller pairs 402 and 403 as downstream side conveying roller pairs that each nip and convey a sheet on the downstream side of the conveying belt 12 in the conveying direction X are each configured to be contactable and separable. That is, the contact/separation mechanism (conveying roller pair moving unit) 31 described using FIGS. 8 and 9A and 9B can be applied to the conveying roller pairs 402 and 403. The contact/separation mechanism 31 allows the conveying roller pair to be brought into a contact or a separated state but also to be moved between the nip position for applying a conveying force to the sheet and the nip release position at which a nip pressure is lower than that at the nip position. Thus, the downstream side conveying roller pairs 402 and 403 can be moved to the nip position and nip release position.

The "nip release position" includes not only a position of "completely separated state" as described above but also a position of "reduced nip pressure state" which is a nip pressure state low enough not to influence the regulation operation of the regulating guides 14A and 14B. That is, these two states correspond to the "nip release position". In other words, a position of "a state where the rollers are completely separated" and a position of "a state where the rollers are in contact with each other but the nip pressure therebetween is lower than that when the sheet is conveyed" correspond to the "nip release position".

For the sheet S2 having the first length and longer in length than the sheet S1, the guide moving part 420 preferably makes the pair of regulating guides 14A and 14B reach the guide position in a state where the downstream side conveying roller pair 402 is set at the nip release position. This allows the sheet S2 to be conveyed to the conveying roller pair 402 at the timing when the pair of regulating guides 14A and 14B reach the guide position. This facilitates regulation of the sheet S2 by the guide surface 15A in the vicinity of the center of the sheet S2 in the conveying direction X, making easy the skew correction for the sheet S2. As can be seen from the third row, the regulating guides 14A and 14B are made to reach the guide position before the sheet S2 reaches the conveying roller pair 402; however, when a sheet has a longer length within the range of the sheet length of the sheet S2, the regulating guides 14A and 14B may be made to reach the guide position after the front end of the sheet S2 reaches or passes through the conveying roller pair 402.

For the sheet S3 having a second length longer than the first length, the guide moving part 420 locates the pair of regulating guides 14A and 14B at the retracting position when the sheet S3 is passed from the upstream side conveying roller pair 401 to the conveying belt 12. That is, the sheet S3 is received in a state where the regulating guides 14A and 14B are located at the retracting position. Thereafter, the guide moving part 420 makes the pair of regulating guides 14A and 14B reach the guide position from the retracting position in a state where the front end of the sheet S3 conveyed while being nipped by the conveying belt 12 and balls 20 is located downstream relative to the downstream end 15A2 of the guide surface 15A in the conveying direction X.

The sheet S3 has thus a long length, so that when the regulating guides 14A and 14B are made to reach the guide position in a state where the front end of the sheet S is located upstream of the downstream end 15A2 of the guide surface 15A as in the case of the sheets S1 and S2, the rear end side of the sheet S3 may still be in the state nipped by the upstream side conveying roller pair 401. Even if the rear end side of the sheet S3 is not nipped by the conveying roller pair 401, only the downstream side portion of the sheet S3 is regulated by the guide surface 15A and therefore the skew of the sheet S3 cannot sufficiently be corrected. Thus, for the sheet S3 having the second length, the regulating guides 14A and 14B are made to reach the guide position in a state where the front end of the sheet S3 is located downstream relative to the downstream end 15A2 of the guide surface 15A in the conveying direction X.

For the sheet S3 having the second length, the guide moving part 420 preferably makes the pair of regulating guides 14A and 14B reach the guide position in a state where the downstream side conveying roller pairs 402 and 403 are set at the nip release position. This allows the sheet S3 to be conveyed to the conveying roller pair 403 at the timing when the regulating guides 14A and 14B reach the guide position. This facilitates regulation of the sheet S3 by the guide surface 15A in the vicinity of the center of the sheet S2 in the conveying direction X, making easy the skew correction for the sheet S3. As can be seen from the fourth row, the regulating guides 14A and 14B are made to reach the guide position before the sheet S3 reaches the conveying roller pair 403; however, when a sheet has a longer length within the range of the sheet length of the sheet S3, the regulating guides 14A and 14B may be made to reach the guide position after the front end of the sheet S3 reaches or passes through the conveying roller pair 403.

Further, for the sheet S3 having the second length, the guide moving part 420 starts moving the pair of regulating guides 14A and 14B from the retracting position to the guide position in a state where the rear end of the sheet S3 is being nipped by the upstream side conveying roller pair 401. Then, after the rear end of the sheet S3 passes through the conveying roller pair 401, the pair of regulating guides 14A and 14B are made to reach the guide position. That is, the sheet S3 has a long length, so that if the start timing of moving the regulating guides 14A and 14B is late, the regulating guides 14A and 14B may reach the guide position after the front end of the sheet S3 reaches the downstream side conveying roller pair 402 or conveying roller pair 403 downstream from the conveying roller 402. In this case, if the nipping of the sheet S3 by the conveying roller pairs 402 and 403 is not released, the regulating guides 14A and 14B are located at the guide position in a state where the sheet S3 is being conveyed by the conveying roller pair 402 or 403. To prevent this, sheet conveying speed may be reduced although the productivity is lowered.

Thus, in the present embodiment, for the sheet S3 having the second length, the regulating guides 14A and 14B start moving to the guide position in a state where the rear end of the sheet S3 is being nipped by the conveying roller pair 401. The start timing of moving the regulating guides 14A and 14B is set such that the front end of the sheet S3 passes through the conveying roller pair 401 before the regulating guides 14A and 14B reach the guide position.

Further, the guide moving part 420 moves the pair of regulating guides 14A and 14B to the retracting position at the timing when the front end of a sheet that has been conveyed by a predetermined amount in a state where the pair of regulating guides 14A and 14B are located at the guide position is nipped by a conveying roller pair disposed downstream in the conveying direction relative to the front end of the sheet at that time and capable of nipping and conveying the sheet. For example, for the sheet S1 in the second row, the regulating guides 14A and 14B start moving to the retracting position at the timing when the sheet S1 is nipped by the conveying roller pair 402. For the sheet S2 in the third row, the regulating guides 14A and 14B start moving to the retracting position at the timing when the sheet S2 is nipped by the conveying roller pair 403 on the further downstream side. For the sheet S3 in the fourth row, the regulating guides 14A and 14B start moving to the retracting position at the timing when the sheet S1 is nipped by the conveying roller pair 204 on the further downstream side. For the sheet S4 in the fifth row, the regulating guides 14A and 14B stay at the guide position.

By thus changing the start timing of moving the regulating guides 14A and 14B to the retracting position according to the sheet length, a sufficient distance for conveying the sheet while regulating the sheet with the guide surface 15A can be ensured to facilitate sheet skew correction. Further, the regulating guides 14A and 14B start moving to the retracting position in a state where the sheet is being nipped and conveyed by the downstream side conveying roller pair, making it possible to prevent sheet conveyance from being unstable after skew correction. That is, if the regulating guides 14A and 14B start moving to the retracting position in a state where the sheet is not being conveyed by the conveying roller pair, the sheet being conveyed nipped by the conveying belt 12 and balls 20 may be skewed again due to separation of the guide surface 15A from the end edge of the sheet in the width direction. Thus, in the present embodiment, the regulating guides 14A and 14B start moving to the retracting position after the sheet is nipped and conveyed by the downstream side conveying roller pair in a state where the end edge of the sheet is being regulated by the guide surface 15A.

When the upstream side conveying roller pair 401 is configured to be contactable and separable, it may be brought into a separated state during the time after the front end of the sheet is passed to the conveying belt 12 and before the rear end of the sheet is completely passed through the conveying roller pair 401. That is, the contact/separation mechanism (conveying roller pair moving unit) 31 described using FIGS. 8 and 9A and 9B can be applied to the conveying roller pair 401. The contact/separation mechanism 31 can move the conveying roller pair to the nip position and the nip release position as described above. Thus, the conveying roller pair 401 may be moved to the nip release position with a low nip pressure during the time after the front end of the sheet S is passed to the conveying belt 12 and before the rear end of the sheet S is completely passed through the conveying roller pair 401.

In this case, the pair of regulating guides 14A and 14B are made to reach the guide position after the conveying roller pair 401 is brought into a separated state (moved from the nip position to the nip release position) by the contact/separation mechanism 31. That is, the guide moving part 420 may make the pair of regulating guides 14A and 14B reach the guide position after the upstream side conveying roller pair 401 is set at the nip release position.

Specifically, the sheet is conveyed by the conveying roller pair 511 (FIG. 4, etc.) disposed upstream relative to the conveying roller pair 401, and the nipping of the sheet by the conveying roller pair 401 is released after the front end of the sheet is nipped between the conveying belt 12 and balls 20. Thereafter, the regulating guides 14A and 14B are made to reach the guide position after the rear end of the sheet is passed through the conveying roller pair 511. After that, when the front end of the sheet is nipped by the downstream side conveying roller pair 402, the regulating guides 14A and 14B are moved to the retracting position. Then, when the rear end of the sheet is passed through the upstream side conveying roller pair 401, the conveying roller pair 401 is set back from the nip release position to the nip position.

As described above, in the present embodiment, the regulating guides 14A and 14B are at the retracting position when the sheet is at the upstream side in the conveying direction X, and the both end edges of the sheet are separated from the guide surfaces 15A. Then, the regulating guides 14A and 14B reach the guide position at a timing according to the sheet length after the sheet is conveyed further downstream to such a degree that the rear end of the sheet is passed through the conveying roller pair 401. Then, the both end edges of the sheet in the width direction Y are regulated by the guide surfaces 15A. After abutting against the guide surfaces 15A, the sheet is conveyed in a direction parallel to the guide surfaces 15A while slipping on the conveying belt 12 with the both end edges thereof following the guide surfaces 15A. In this manner, the side registration and side skew of the sheet are corrected.

In the present embodiment, the control part 203 moves the pair of regulating guides 14A and 14B from the retracting position to the guide position during the time when the sheet is being conveyed nipped by the conveying belt 12 and balls 20. This allows side registration and side skew of the sheet to be corrected without stopping conveyance of the sheet, increasing the productivity. However, the alignment operation of moving the pair of regulating guides 14A and 14B from the retracting position to the guide position may be performed after conveyance of the sheet is once stopped. In this case, displacement correction can be made more reliably, although the productivity is lowered.

Thus, in the present embodiment, the pair of regulating guides 14A and 14B are made to reach the guide position from the retracting position after the rear end of the sheet passed to the conveying belt 12 is completely passed through the upstream side conveying roller pair 401 (that is, after the sheet is completely separated from the conveying roller pair 401). This makes it less likely to cause interference between the pair of regulating guides 14A and 14B and the sheet at the time when the sheet is passed to the conveying belt 12. Further, the pair of regulating guides 14A and 14B are not at the guide position during the time when the sheet is being conveyed by the upstream side conveying roller pair 401, so that it is possible to prevent the sheet being conveyed by the conveying roller pair 401 from being bent due to abutment against any of the regulating guides.

Further, the pair of regulating guides 14A and 14B are moved to the guide position after the rear end of the sheet is passed through the conveying roller pair 401, so that, in order to correct sheet displacement or the like, it is not necessary to obliquely convey a sheet so as to achieve abutment between the sheet and the regulating guide. This eliminates the need to increase the length of the sheet conveying path for displacement correction, preventing an increase in apparatus size. That is, it is possible to correct displacement of the sheet in the width direction Y while preventing an increase in apparatus size.

When the pair of regulating guides 14A and 14B reach the guide position simultaneously, vibration of the pair of regulating guides 14A and 14B may affect conveyance of the sheet. That is, in the course of moving from the retracting position to the guide position, the regulating guides 14A and 14B produce vibration when stopping at the guide position. Thus, when the regulating guides 14A and 14B reach the guide position simultaneously, they may push the sheet. To cope with this, in the present embodiment, the pair of regulating guides 14A and 14B are made to reach the guide position at different timings.

That is, when moving the pair of regulating guides 14A and 14B from the retracting position to the guide position, the guide moving part 420 makes the front side regulating guide 14A reach the guide position after the rear side regulating guide 14B reaches the guide position.

In the present embodiment, the regulating guides 14A and 14B move at the same speed (e.g., 700 mm/s). Further, the regulating guides 14A and 14B start moving from the retracting position to the guide position at the same timing. With this configuration, the regulating guide 14B reaches the guide position earlier than the regulating guide 14A. That is, the pair of regulating guides 14A and 14B can be made to reach the guide position at different timings. This prevents a risk of vibrations that can take place at the same time as the regulating guides 14A and 14B halt, thereby preventing the regulating guides 14A and 14B from pushing the end edges of the sheet in the width direction Y. As a result, sheet conveyance becomes stable.

The regulating guides 14A and 14B may move at different speeds as long as the regulating guide 14B reaches the guide position earlier than the regulating guide 14A. For example, the regulating guide 14B may be configured to move at higher speed. Further, the regulating guides 14A and 14B start moving from the retracting position to the guide position at different timings. For example, the regulating guide 14B may start moving at an earlier timing. Further, it may be possible for the regulating guide 14A to reach the guide position earlier than the regulating guide 14B. Further, it may be possible that the distances between the end edges of the sheet in the width direction Y and the corresponding regulating guides 14A and 14B at the retracting position are the same and that the regulating guides 14A and 14B are made to reach the guide position at the same timing.

[Specific Examples of Operation Timing of Regulating Guide According to Sheet Length]

The following describes specific examples of the operation timing of the regulating guide according to the sheet length using FIG. 11. First, for the sheet S1 (sheet length: 148.0 mm) in the second row, the regulating guides 14A and 14B start moving from the retracting position to the guide position at the point of time when the sheet is conveyed by 210.7 mm after the sheet rear end passes the sheet detection sensor 433. The sheet S1 is conveyed by the conveying belt 12 while regulating guides 14A and 14B are being moved, and the regulating guides 14A and 14B reach the guide position at the point of time when the sheet S1 has been conveyed by 65.2 mm.

Thereafter, the regulating guides 14A and 14B start moving from the guide position to the retracting position at the point of time when the front end of the sheet S1 that has passed the sheet detection sensor 435 passes beyond the downstream side conveying roller pair 402 by 10 mm. Then, the regulating guides 14A and 14B reach the retracting position at the point of time when the sheet S1 has been conveyed by the conveying roller pair 402 by 65.2 mm. At this time point, the front end of the subsequent sheet is located upstream relative to the upstream ends of the regulating guides 14A and 14B in the conveying direction.

For the sheet S1, which has a length shorter than the length of the guide surface 15A of the regulating guides 14A and 14B, the regulating guides 14A and 14B are moved from the retracting position to the guide position in a state where the entire sheet S1 falls within the range (between the upstream end 15A1 of the guide surface 15A and the downstream end 15A2) of the guide surface 15A. The entire sheet still falls within the range of the guide surface 15A even at the point of time when the regulating guides 14A and 14B reach the guide position.

As described above, in the present embodiment, for the sheet S1 having a length of 148 mm to 215.9 mm, the regulating guides 14A and 14B are moved after the rear end of the sheet S1 passes the upstream end 15A1 of the guide surface 15A in the conveying direction. In the present embodiment, conveying the sheet S1 by 42.5 mm in a state where the regulating guides 14A and 14B guide the sheet S1 at the guide position computationally allows skew correction to be achieved. Thus, the length of the sheet that can be conveyed by 42.5 mm or more by the time from when the sheet rear end passes the upstream end 15A1 of the guide surface 15A (and the regulating guides 14A and 14B are moved to the guide position) to when the sheet front end reaches the conveying roller pair 402 is 148 mm to 215.9 mm.

For the sheet S2 (sheet length: 297.1 mm) in the third row, the regulating guides 14A and 14B start moving from the retracting position to the guide position at the point of time when the sheet is conveyed by 64.8 mm after the sheet rear end passes the sheet detection sensor 433. At this time point, the front end of the sheet S2 falls within the range of the guide surface 15A, and the rear end thereof is located upstream relative to the upstream end 15A1 of the guide surface 15A in the conveying direction.

The sheet S2 is conveyed by the conveying belt 12 while regulating guides 14A and 14B are being moved, and the regulating guides 14A and 14B reach the guide position at the point of time when the sheet S2 has been conveyed by 65.2 mm. At this time point, the front end of the sheet S2 is located upstream relative to the downstream end 15A2 of the guide surface 15A in the conveying direction. For the sheet S2, the downstream side conveying roller pair 402 is brought into a separated state at the same time when the sheet front end enters the range of the guide surface 15A.

The sheet S2 is conveyed by the conveying belt 12 in a state where the regulating guides 14A and 14B are located at the guide position. Then, at the point of time when the sheet front end is passed through the conveying roller pair 402, which is brought into a separated state, and the sheet detection sensor 436 and further passes 10 mm beyond the downstream side conveying roller pair 403, the regulating guides 14A and 14B start moving from the retracting position to the guide position. Then, the regulating guides 14A and 14B reach the retracting position at the point of time when the sheet S2 has been conveyed over a distance of 65.2 mm by the conveying roller pair 403. At this time point, the front end of the subsequent sheet is located upstream relative to the upstream ends of the regulating guides 14A and 14B in the conveying direction. Thereafter, the conveying roller pair 402 is set back from the separated position (nip release position) to the nip position.

For the sheet S3 (sheet length: 530.6 mm) in the fourth row, the regulating guides 14A and 14B start moving from the retracting position to the guide position in a state where the rear end of the sheet is located 35.1 mm upstream relative to the upstream side conveying roller pair 401 (which is determined based on the conveying amount after detection of the front end of the sheet S3 by the sheet detection sensor 433).

At the timing when the sheet S3 is conveyed by 65.2 mm, and the regulating guides 14A and 14B reach the guide position, the rear end of the sheet S3 is passed through conveying roller pair 401. At this time point, the front end of the sheet S3 is located downstream from the downstream end 15A2 of the guide surface 15A in the conveying direction. That is, the regulating guides 14A and 14B reach the guide position in a state where the sheet S3 is located so as to span both the upstream and downstream ends 15A1 and 15A2 of the guide surface 15A. The downstream side conveying roller pairs 402 and 403 are brought into a separated state at the same time when the front end of the sheet S3 enters the range of the guide surface 15A.

The sheet S3 is conveyed by the conveying belt 12 in a state where the regulating guides 14A and 14B are located at the guide position, and the regulating guides 14A and 14B start moving from the guide position to the retracting position at the point of time when the sheet front end reaches a location 10 mm downstream from the conveying roller pair 204 in the multi-stage feeder 200 and reach the retracting position at the point of time when the sheet S3 is conveyed over a distance of 65.2 mm by the conveying roller pair 204. At this time point, the front end of the subsequent sheet is located upstream relative to the upstream ends of the regulating guides 14A and 14B in the conveying direction. Thereafter, the conveying rollers 402 and 403 are set back from the separated position to the nip position.

As described above, for the sheet S3, the regulating guides 14A and 14B start moving in a state where the rear end of the sheet is nipped by the conveying roller pair 401, but at the point of time when the regulating guides 14A and 14B reach the guide position, the sheet rear end is passed through the conveying roller pair 401 without fail. As described above, when the conveying roller pair 401 is configured to be contactable and separable, it is set at the separated position before the regulating guides 14A and 14B reach the guide position.

For the sheet S4 (sheet length: 1300 mm) in the fifth row, the sheet is received in a state where the regulating guides 14A and 14B are located at the retracting position and stay there until the sheet rear end is conveyed to the downstream side apparatus. In this case, the conveying roller pairs convey the sheet S3 without being brought into separated state. That is, for the sheet S4, the position of the regulating guides 14A and 14B is not changed from when the sheet is received to when the sheet reaches the downstream side apparatus. Thus, the sheet S4 having a long length can be conveyed without being damaged. The sheet S4 is subjected to skew correction such that the front end thereof is made to abut against the conveying roller pair in the image forming apparatus 100, for example.

The above numeral values are merely examples and may be changed according to the size, structure, and the like of the apparatus. That is, sheet conveyance, movement of the regulating guides 14A and 14B, and contact/separation of the conveying roller pair are performed according to the sheet length.

The above-described embodiment can handle sheets of various lengths while suppressing an increase in the apparatus size. That is, for the sheets S1 and S2 having the first length, the pair of regulating guides 14A and 14B are made to reach the guide position from the retracting position in a state where the front end of the sheet is located between the upstream and downstream ends 15A1 and 15A2 of the guide surface 15A. For the sheet S3 having the second length longer than the first length, the pair of regulating guides 14A and 14B are made to reach the guide position from the retracting position in a state where the front end of the sheet is located downstream from the downstream end 15A2 of the guide surface 15A. By thus changing the timing at which the regulating guides 14A and 14B reach the guide position according to the sheet length, it is possible to handle sheets of various lengths without increasing the apparatus size.

Other Embodiments

In the above embodiments, the control part 203 for controlling the relay conveying apparatus 400 is provided in the multi-stage feeder 200; however, the above control may be realized by the control part 140 of the image forming apparatus 100. Further, a control part for controlling components of the relay conveying apparatus 400 may be provided in the relay conveying apparatus 400. Furthermore, the sheet conveying apparatus is not limited to the above relay conveying apparatus, but may be of any other configuration, as long as it can correct displacement of a sheet.

This application claims priority from Japanese Patent Application No. 2020-144971 incorporated herein by reference.

The invention claimed is:

1. A sheet conveying apparatus that receives and conveys a sheet conveyed by a conveying unit for conveying sheets in a predetermined conveying direction, comprising:

a conveying belt configured to convey the sheet passed from the conveying unit and extending in the predetermined conveying direction;

a plurality of balls that are arranged in the predetermined conveying direction so as to contact the sheet conveyed by the conveying belt and configured to be rotatable in any direction while contacting the sheet conveyed by the conveying belt, the plurality of balls being disposed on the conveying belt via the sheet;

a pair of guides that are disposed at both sides relative to the conveying belt in a width direction crossing the predetermined conveying direction, the pair of guides each having a support surface that supports an end portion of the sheet conveyed by the conveying belt in the width direction and a guide surface that faces an end edge of the sheet conveyed by the conveying belt in the width direction;

a guide moving unit configured to move the pair of guides to a guide position that guides the end portion of the sheet supported by the support surface while being conveyed by the conveying belt and to a retracting position that is retracted further away from the end edge of the in the width direction than the guide position; and a control unit that controls the conveying belt and the guide moving unit, wherein the control unit is configured to control such that:

for a sheet having a first sheet length in the predetermined conveying direction, the guide moving unit locates the pair of guides at the retracting position when the sheet is passed from the conveying unit to the conveying belt, and then makes the pair of guides reach the guide position from the retracting position in a state while the sheet is being conveyed by the conveying belt, and in a state where a front end of the sheet is located between upstream and downstream ends of the guide surface in the predetermined conveying direction, and for a sheet having a second sheet length longer than the first sheet length, the guide moving unit locates the pair of guides at the retracting position when the sheet is passed from the conveying unit to the conveying belt, and then makes the pair of guides reach the guide position from the retracting position in a state while the sheet is being conveyed by the conveying belt and in a state where the front end of the sheet is located further downstream from the downstream end of the guide surface in the predetermined conveying direction.

2. The sheet conveying apparatus according to claim 1, wherein for a sheet having the first sheet length and shorter in length than the guide surface in the predetermined conveying direction by a predetermined amount, the guide moving unit makes the pair of guides reach the guide position in a state where the sheet is located between the upstream and downstream ends of the guide surface in the predetermined conveying direction.

3. The sheet conveying apparatus according to claim 1, wherein the guide moving unit makes the pair of guides reach the guide position after a rear end of the sheet is conveyed while the sheet is being nipped by the conveying belt and balls passes the conveying unit.

4. The sheet conveying apparatus according to claim 1, wherein the conveying unit is an upstream side conveying roller pair that nips and conveys a sheet, the upstream side conveying roller pair is movable to a nip position at which it applies a conveying force to the sheet and a nip release position where the pair of conveyance rollers are separate from the nip position, and the guide moving unit makes the pair of guides reach the guide position after the upstream conveying roller pair is set at the nip release position.

5. The sheet conveying apparatus according to claim 1, further comprising a downstream side conveying roller pair that nips and conveys a sheet at the downstream side relative to the conveying belt in the predetermined conveying direction and is movable to a nip position at which it applies a conveying force to the sheet and a nip release position where the pair of conveyance rollers are separate from the nip position, wherein for the sheet having the second sheet length, the guide moving unit makes the pair of guides reach the guide position in a state where the downstream side roller pair is set at the nip release position.

6. The sheet conveying apparatus according to claim 1, wherein the conveying unit is an upstream side conveying roller pair that nips and conveys a sheet, and for a sheet having the second sheet length, the guide moving unit starts moving the pair of guides from the retracting position to the guide position in a state where the rear end of the sheet is nipped by the upstream side conveying roller pair and makes the pair of guides reach the guide position after the rear end of the sheet is passed through the upstream conveying roller pair.

7. An image forming system comprising:

a conveying unit for conveying sheets in a predetermined conveying direction;

a conveying belt configured to convey the sheet passed from the conveying unit and extending in the predetermined conveying direction;

a plurality of balls that are arranged in the predetermined conveying direction so as to contact the sheet conveyed by the conveying belt and configured to be rotatable in any direction while contacting the sheet conveyed by the conveying belt, the plurality of balls being disposed on the conveying belt via the sheet;

a pair of guides that are disposed at both sides relative to the conveying belt in a width direction crossing the predetermined conveying direction, the pair of guides each having a support surface that supports an end portion of the sheet conveyed by the conveying belt in the width direction and a guide surface that faces an end edge of the conveying belt in the width direction;

a guide moving unit configured to move the pair of guides to a guide position that guides the end portion of the sheet supported by the support surface while being conveyed by the conveying belt and to a retracting position that is retracted further away from the end edge of the in the width direction than the guide position;

an image forming part that forms an image on a sheet conveyed by the conveying belt; and a control unit that controls the conveying unit, the conveying belt and the guide moving unit, wherein the control unit is configured to control such that:

for a sheet having a first sheet length in the predetermined conveying direction, the guide moving unit locates the pair of guides at the retracting position when the sheet is passed from the conveying unit to the conveying belt, and then makes the pair of guides reach the guide position from the retracting position in a state while the sheet is being conveyed by the conveying belt, and in a state where a front end of the sheet is located between upstream and downstream ends of the guide surface in the predetermined conveying direction, and for a sheet having a second sheet length longer than the first sheet length, the guide moving unit locates the pair of guides at the retracting position when the sheet is passed from the conveying unit to the conveying belt, and then makes the pair of guides reach the guide position from the retracting position in a state while the sheet is being conveyed by the conveying belt and in a state where the front end of the sheet is located further downstream from the downstream end of the guide surface in the predetermined conveying direction.

* * * * *